US007751628B1

(12) United States Patent
Reisman

(10) Patent No.: US 7,751,628 B1
(45) Date of Patent: Jul. 6, 2010

(54) METHOD AND APPARATUS FOR PROGRESSIVELY DELETING MEDIA OBJECTS FROM STORAGE

(76) Inventor: Richard R. Reisman, 20 E. 9$^{th}$ St., Apt. 12K, New York, NY (US) 10003

( * ) Notice: Subject to any disclaimer, the term of this patent is extended or adjusted under 35 U.S.C. 154(b) by 2110 days.

(21) Appl. No.: 10/328,327

(22) Filed: Dec. 23, 2002

Related U.S. Application Data

(60) Provisional application No. 60/343,804, filed on Dec. 26, 2001.

(51) Int. Cl.
*G06K 9/36* (2006.01)
(52) U.S. Cl. .................................. 382/232; 707/100
(58) Field of Classification Search .............. 382/100, 382/232, 235, 243, 246, 276, 277; 707/100, 707/101, 102; 348/14.01, 14.13, 439.1, 568; 380/217
See application file for complete search history.

(56) References Cited

U.S. PATENT DOCUMENTS

| | | | |
|---|---|---|---|
| 6,092,107 A | 7/2000 | Eleftheriadis et al. | |
| 6,157,929 A | 12/2000 | Zamiska et al. | |
| 6,229,927 B1* | 5/2001 | Schwartz | 382/248 |
| 6,236,395 B1 | 5/2001 | Sezan et al. | |
| 6,246,797 B1* | 6/2001 | Castor et al. | 382/232 |
| 6,263,313 B1 | 7/2001 | Milsted et al. | |
| 6,310,886 B1 | 10/2001 | Barton | |
| 6,324,338 B1 | 11/2001 | Wood et al. | |
| 6,512,855 B1* | 1/2003 | Delean | 382/276 |
| 6,879,634 B1* | 4/2005 | Oz et al. | 375/240.26 |
| 7,116,717 B1* | 10/2006 | Eshet et al. | 375/240.25 |
| 2004/0139103 A1* | 7/2004 | Boyce et al. | 707/102 |

OTHER PUBLICATIONS

"JPEG2000, the Next Millennium Compression Standard for Still Images", Maryline Charrier, Diego Santa, Cruz Mathias Larsson, O-7695-0253-9/99, 1999, IEEE.
"JPEG Compression Metric as a Quality Aware Image Transcoding", Surendar Chandra and Carla Schlatter Ellis, Proceedings of USITS' 99: The 2nd USENIX Symposium on Internet Technologies & Systems, Boulder, Colorado, USA, Oct. 11-14, 1999.
"Hierarchical Storage Management in a Distributed VOD System", David W. Brubeck Lawrence A. Rowe, IEEE MultiMedia vol. 3, Issue 3 (Sep. 1996).
"Managing the storage and battery resources in an image capture device (digital camera) using dynamic" transcoding, Chandra, et. al., ACM International Workshop on Wireless Mobile Multimedia, 2000.

(Continued)

*Primary Examiner*—Anand Bhatnagar
(74) *Attorney, Agent, or Firm*—Walter G. Hanchuk; Chadbourne & Parke LLP

(57) ABSTRACT

A system for managing storage space on an electronic storage medium is provided in which a file format for stored data allows for progressive deletion of low-significance data, for example in a video or audio file, while allowing the remaining portions of the file to be subsequently retrieved. The file format allows for the ready deletion of low-significance data without having to open, edit and subsequently rewrite the data. Furthermore, rules-based algorithms for the deletion of low-significance data allow a user to store and progressively delete such low-significance data in accordance with time parameters, available storage space and the like, without having to delete the full file.

145 Claims, 6 Drawing Sheets

OTHER PUBLICATIONS

Quality Aware Transcoding, www.cs.duke.edu/~surrendar/research/qat.html, printed Jun. 11, 2001.

Download Scripts from Kodak, http://www/kodak.com/US/en/digital/cameras/dc260/downloadScripts.shtml, printed Jun. 7, 2001.

Digita, Chapter 2, Script Command Reference, p. 45, Jul. 15, 1998.

ReplayTV Thoughts, http://www.sgsw.com/misc/replaytv.html, printed May 24, 2001.

"A Scalable and Progressive Audio Codec", Mark, S. Vinton and Les. E. Atlas, IEEE ICASSP 2001, May 7-11, 2001.

"Quality Aware Transcoding: An Application Level Technique to Dynamically Adapt Multimedia Content", Surendar Chandra, Department of Computer Science, Duke University (dissertation), 2000.

"Enterprise Storage Solutions handbook", SG24-5250-02, IBM International Technical Support Organization, Jan. 2001, Chapter 11. Introduction to storage management software.

"CREW Lossless/Lossy Image Compression"—Contribution to ISO/IEC JTC 1.29.12, A. Zandi, M. Boliek, E.L. Schwartz, M.J. Gormish, J.D. Allen, ISO/IEC JTC 1/SC29/WG 1 N 196, Jun. 30, 1995.

"Fine Granular Scalability": A new framework for Internet video coding & streaming, Hayder Radha, Yingwei Chen and Mihaela van der Schaar, Philips Research, 2000, http://www.stardust.com/cdnweek/whitepapers/fgs_01.htm, downloaded May 25, 2001.

Archiving Data—"A Quiet Market With Significant Potential", Lou Agosta, Giga Information Group, Oct. 9, 2001.

Active Archiving: "Relieving The Pain Of Overloaded Databases", Princeton Softech, White Paper, Apr. 2001.

"Linear Flash Memory Devices on Microsoft Windows CE 2.1", Microsoft Corporation, Apr. 2000, http://msdn.microsoft.com/library/en-us/dnce21/html/flash21.asp, printed Dec. 14, 2001.

"A File System for the 21st Century: Previewing the Windows NT 5.0 File System", Jeffrey Richter and Luis Felipe Cabrera, Microsoft Systems Journal, Nov. 1998.

"Storage Alternatives for Mobile Computers", F. Douglis, R. Caceres, B. Marsh, F. Kaashoek, K. Li, and J. Tauber, To appear in First Symposium on Operating Systems Design and Implementation, Nov. 1994.

"Tiger Shark-a scalable file system for multimedia", Haskin, R.L., IBM Journal of Research and Development, vol. 42, No. 2, p. 185-97, Mar. 1998.

"Receiver-driven layered multicast", V. Jacobson S. McCanne and M. Vetterli,. ACM SIGCOMM'96, Aug. 1996.

"Low-complexity video coding for receiver-driven layered multicast", McCanne, S., Vetterli, M., Jacobson, V., IEEE journal on selected areas in communications, vol. 16, No. 6, p. 983-1001, 1997, downloaded Jun. 6, 2001.

"Hard Disk Compression", Sheryl Canter, PC Magazine, Nov. 21, 1995, www.zdnet.com/pcmag/issues/1420/pcm00072.htm, printed May 25, 2001.

CCITT, "Terminal Equipment And Protocols For Telematic Services", Information Technology—Digital Compression And Coding Of Continuous-Tone Still Images—Requirements And Guidelines Recommendation T.81, Section 4—General, Sep. 1992.

"Embedded Block Coding in JPEG2000", David Taubman1, Erik Ordentlich2, Marcelo Weinberger, Gadiel Seroussi, Information Theory Research Group, HP Laboratories Palo Alto, HPL-2001-35, Section 1—Introduction, Feb. 23, 2001.

"Wavelet Lossy and Lossless Image Compression Techniques—Use of the Lifting Scheme", A. Munteanu, J. Cornelis and P. Cristea, www.dsp.pub.ro/articles/wavletcomp/fianl.htm, printed Jun. 13, 2001.

"New Ground for MPEG-4 Visual", Jens-Rainer Ohm, Institute for Communications Engineering Aachen University of Technology—RWTH, http://www.cselt.it/mpeg/documents/ibc2000_tutorial/Ohm.pdf, IBC 2000, downloaded May 23, 2001.

"Chapter 20, Disks and File Systems", pp. 11-21, www.microsoft.com/TechNet/win95/reskit/part5/rk20_dsk.asp?a-printable, printed May 25, 2001.

"Overview of the MPEG-4 Standard" (V.18—Singapore Version) ISO/IEC JTC1/SC29/WG11 N4030, www.cselt.it, downloaded May 25, 2001 (document states Mar. 2001).

IEEE Transactions on Circuits and Systems for Video Technology, vol. 11 Issue: 3 Date: Mar. 2001, Special Issue on Streaming Video, "Video coding for streaming media delivery on the Internet", Conklin, G.J.; Greenbaum, G.S.; Lillevold, K.O.; Lippman, A.F.; Reznik, Y.A., pp. 269-281.

IEEE Transactions on Circuits and Systems for Video Technology, vol. 11 Issue: 3 Date: Mar. 2001, Special Issue on "Streaming Video, Streaming video over the Internet: approaches and directions", Dapeng Wu; Hou, Y.T.; Wenwu Zhu; Ya-Qin Zhang; Peha, J.M., pp. 282-300.

IEEE Transactions on Circuits and Systems for Video Technology, vol. 11 Issue: 3 Date: Mar. 2001, Special Issue on Streaming Video, "Overview of fine granularity scalability in MPEG-4 video standard", Weiping Li, pp. 301-317.

IEEE Transactions on Circuits and Systems for Video Technology, vol. 11 Issue: 3 Date: Mar. 2001, Special Issue on Streaming Video, "A hybrid temporal-SNR fine-granular scalability for Internet video", van der Schaar, M.; Radha, H., pp. 318-331.

IEEE Transactions on Circuits and Systems for Video Technology, vol. 11 Issue: 3 Date: Mar. 2001, Special Issue on Streaming Video, "A framework for efficient progressive fine granularity scalable video coding", Feng Wu; Shipeng Li; Ya-Qin Zhang, pp. 332-344.

IEEE Transactions on Circuits and Systems for Video Technology, vol. 11 Issue: 3 Date: Mar. 2001, Special Issue on Streaming Video, "A novel two-pass VBR coding algorithm for fixed-size storage application", Yue Yu; Jian Zhou; Yiliang Wang; Chang Wen Chen, pp. 345-356.

IEEE Transactions on Circuits and Systems for Video Technology, vol. 11 Issue: 3 Date: Mar. 2001, Special Issue on Streaming Video, "Rate-distortion optimized layered coding with unequal error protection for robust Internet video", Gallant, M.; Kossentini, F., pp. 357-372.

IEEE Transactions on Circuits and Systems for Video Technology, vol. 11 Issue: 3 Date: Mar. 2001, Special Issue on Streaming "Video, Video multicast using layered FEC and scalable compression", Wai-Tian Tan; Zakhor, A., pp. 373-386.

IEEE Transactions on Circuits and Systems for Video Technology, vol. 11 Issue: 3 Date: Mar. 2001, Special Issue on Streaming Video, "Object-based transcoding for adaptable video content delivery", Vetro, A.; Huifang Sun; Yao Wang, pp. 387-401.

* cited by examiner

| ITEM NAME 502 | TYPE 504 | DESCRIPTION 506 | CODING FORMAT 508 | LAYER NUMBER 510 | LAYER SIZE 512 | LAYER QUALITY 514 | LAYER FILE NAME 516 | STATUS 518 |
|---|---|---|---|---|---|---|---|---|
| APOCALYPSE NOW | HDTV | MOVIE... | MPEG-4 | 1 | 300MB | 70% | AN1 | SAVED |
| APOCALYPSE NOW | HDTV | MOVIE... | MPEG-4 | 2* | 300MB | 20% | AN2 | SAVED |
| APOCALYPSE NOW | HDTV | MOVIE... | MPEG-4 | 3 | 300MB | 10% | AN3 | DELETED |
| BIRTHDAY MOVIE | SUPER8 | 5TH BIRTHDAY | MPEG-4 | 1* | 50MB | 80% | BDAY1 | SAVED |
| BIRTHDAY MOVIE | SUPER8 | 5TH BIRTHDAY | MPEG-4 | 2 | 50MB | 20% | BDAY2 | DELETED |
| MATH LECTURE | MP3 | TENSORS 9/4 | MP3 | 1 | 50KB | 80% | MATH1 | SAVED |
| MATH LECTURE | MP3 | TENSORS 9/4 | MP3 | 2* | 50KB | 20% | MATH2 | SAVED |

DIRECTORY ELEMENTS

FIG. 5

METHOD AND APPARATUS FOR PROGRESSIVELY DELETING MEDIA OBJECTS FROM STORAGE

This application claims the benefit of U.S. Provisional Application No. 60/343,804, filed Dec. 26, 2001, which is incorporated herein by reference.

FIELD OF THE INVENTION

The present invention is directed generally to the storage of media objects such as digital video or audio files or streams, and more particularly to the use of variable levels of compression for flexible and efficient storage of collections of such objects, such as in entertainment systems and audio/video libraries.

BACKGROUND OF THE INVENTION

Effective and flexible storage of collections of audio and video content objects has always been a challenge because of the large number of such objects retained, even by an individual or family. The migration of such continuous media audio or video content to digitally coded forms, and the related convergence of devices for storage and use of such content has stimulated the development of a wide range of storage systems and devices. Various devices have been employed using both fixed media, such as computer-style electronic storage and hard disks, and removable media, such as video cassette recordings (VCR), compact disc (CD), Digital Versatile Disk (DVD), removable electronic storage (such as flash memory or EEPROM, Electrically Erasable Programmable Read-Only Memory), magnetic cards, floppy disks, and the like.

Historically, different forms of audio and video have been handled by different systems and devices, but "digital convergence" is leading toward common and interconnected systems for reception, storage, and playback of all kinds of media. For example, current Digital Video Recorders (DVRs) such as TIVO, REPLAY TV, and ULTIMATETV use PC-style hard disks, and software exists to provide DVR functions on a personal computer (PC), and some such devices are packaged with TV set-top boxes, such as satellite or cable decoders.

The large amount of data bits needed to store audio and video with satisfactory quality of reproduction presents a particular challenge in both the storage and transmission of digital format media objects. This has been particularly critical in transmission, due to rigid bandwidth limits and cost constraints that apply to radio, television, online services, wireless, and the like. In response to this, the use of data compression techniques has become an essential tool. Similar issues apply to other media objects, such as still images.

A variety of methods are used in an effort to gain maximum reduction of object size with minimum loss of quality. Compression has long been used in the coding of audio into digital form for digital telephony as well as in modems and other forms online transmission, in the coding of image files and video for faxing and online distribution, and more recently for digital radio and television. Compression has also been used in data processing systems, with the early impetus again coming from transmission constraints in early remote processing systems. The storage benefits of compression have generally followed as a secondary benefit from work relating to transmission needs.

A key difference between compression in data processing systems and in media systems is in the applicability of lossy compression techniques that can reduce object size by discarding some information that causes little or no perceptible loss in quality. Lossless compression is usually required in data processing environments, because every bit of data can be highly significant. Lossless compression techniques, such as PKZip and Huffman entropy codes, work by transforming inefficient coding schemes to more efficient schemes, such as by exploiting repeating patterns, without loss of any bits in the inversely transformed, decompressed result.

Lossy schemes are used mainly for audio, image and video data, and are typified by standards such as JPEG (the Joint Photographic Experts Group) image format and MPEG (the Motion Picture Experts Group) video format, including the MP3 audio coding defined within MPEG. These lossy schemes generally work by exploiting knowledge of human perception of sound and sight, so that some selected detail is discarded in compression and permanently lost in the decompressed result, but the perceptible impact of that loss is minimized. Such methods involve a trade-off in the amount of reduction obtained and the level of perceptible loss of quality. The level of these tradeoffs can be controlled by the designer of the compression scheme, or left as a parameter to be controlled at the time compression is done.

A further technique of progressive or scalable, layered compression has been applied to exploit these tradeoffs, particularly as they relate to transmission and rendering of digital audio and video. JPEG standards include an optional progressive format, in which the image file is structured to contain a layered sequences of scans, so that the first scan contains a low quality rough version of the image, followed by successive scans that add more detail. This enables an online transmission in which the start of the file can be received and used to present the low quality image, while successive scans are still being received and then progressively rendered to enhance quality. The viewer benefits by not having to wait to see a rough form of the image, gaining both real utility, in having some information, and psychological benefit in not waiting with a blank screen while all of the image data is received and decoded.

As transmission speeds have increased and video transmission has become a greater challenge than transmission of stills, a variation on this technique that addresses motion compensation has been applied in MPEG, with some attention in MPEG-2 and greater focus in MPEG-4. Motion video compression applies to both the spatial dimension of images and the time dimension of the series of images. The multiple images of video data are organized into groups of frames (GOFs) and the layering of gross and refined data is done for each GOF, addressing both spatial frame image data and temporal inter-frame motion differences. Layering here enables achievement of a high degree of flexibility, in that: 1) if bandwidth is limited, even momentarily, the low-significance layers can be discarded by the transmitter or ignored by the receiver in a highly adaptive fashion, and 2) if the receiver has limited processing or working storage resources for decoding (or a low resolution/low fidelity output device that will not benefit from high quality input), it can limit itself to the high-significance layers, all while minimizing the perceived quality loss. Thus such layered coding supports flexible scalability of a single coded form of the data to use for varying bandwidth and decoder or viewer requirements. Fine Granular Scalability (FGS) methods are intended to allow for very flexible scalings of data transmission to the dynamic availability of transmission bandwidth.

A further method of exploiting this scalability in video transmission, as proposed by Radha and by McCanne and others (including much of a Special Issue on Streaming Video in the March 2001 IEEE Transactions on Circuits and Systems for Video Technology), is that of Receiver-driven Layered Multicast (RLM). This involves transmitting each of multiple such layers of video in separate multicast streams, so that different receivers can subscribe to only the number of streams (layers) that they require to obtain the quality level they desire. This provides a high quality transmission to receivers that will benefit from it, while accommodating those that will not. Such methods teach that a layered data stream be partitioned at the time of transmission to create separate layered streams for simultaneous multicast, and that these streams then be reassembled on receipt for combined presentation.

As noted, the emphasis on media compression has been for transmission, rather than for storage management. Data processing systems have, in contrast, seen some attention to compression-oriented storage management, but efforts to apply such methods broadly have been disappointing, and have fallen into disuse. For example, PC storage compression systems like STACKER, DRIVESPACE, and DOUBLESPACE were introduced some time ago to apply compression across various files types commonly stored on a PC disk. Such tools were based on general-purpose compression algorithms to be used across all files on a disk, and they used lossless compression because that was required for data processing files. Such methods are trouble prone, and do not produce good results on audio and video files which are increasingly the dominating use of storage space. The result has been that file-type and format-specific compression techniques have been recognized as saving storage, but attempts to apply compression broadly to storage management have not been seen as promising areas for development.

Thus, specific media compression methods have enabled corresponding benefits in storage systems, even though that has not been a primary objective in their development. For example storage systems based on JPEG compression in digital cameras, and MPEG compression in Digital Video Recorders (DVRs) commonly give the user a choice of quality/compression levels. These allow the user to determine either globally or on an object-by-object basis whether they should be stored at high quality levels that consume large amounts of storage, or in more highly compressed but lower quality form.

Unfortunately, in current systems, these quality/size trade-offs must be made at the time that an object is stored. This is a problem, because the value of the object and the availability of storage space may change over time. As a collection grows and the older items in it age and possibly fall into disuse, their importance may diminish. At the same time, the total amount of storage used will grow, and constraints may make it desirable to reclaim space. In current systems, no provision is made to change the level of compression of an object. The only way to reclaim space is to reduce quality to zero by deleting the object in its entirety. There is, therefore, a need for methods to provide for less draconian, more progressive and gradual ways to adjust the space allocated for stored media objects in a memory device.

A simple way to do this is to take the existing objects, decompress them, and recompress them into a more compressed form, but this takes considerable processing resources, and depending on the specific formats involved, may produce unwanted losses of quality without compensating reductions in size, which can result from non-reversible transformations in the decompression-recompression process. Chandra et. al. at Duke University disclose work that addresses such transcoding of images, with applications to Web browsing for transmission, and to digital cameras for storage. Chandra recognizes the value of being able to reduce the size of images stored in a digital camera, so that additional pictures can be stored in cases when additional storage is not available. The technique applied is to partially decompress the image, and then re-compress from that intermediate form to a lower quality level. This involves the steps of entropy decoding, dequantization, requantization, and entropy recoding. Successive reductions may be done with successive cycles of such transcodings. The problem is that this method requires significant processing resources and time for the transcoding, and for the reading and rewriting of the stored object, each time such a reduction is made.

Layered, scalable compression techniques have the potential to facilitate such an objective to the extent that a storage system can reduce the number of layers that are stored for an object, without having to decompress and recompress the objects. Castor et. al. in U.S. Pat. No. 6,246,797 discloses work that addresses image file size reduction in still and video cameras. With regard to still images, Castor observes that "[a] feature of the present invention is that the image quality level of an image file can be lowered without having to reconstruct the image and then re-encode it, which would be costly in terms of the computational resources used. Rather, the data structures within the image file are pre-arranged so that the image data in the file does not need to be read, analyzed or reconstructed. The image quality level of an image file is lowered simply by keeping an easily determined subset of the data in the image file and deleting the remainder of the data in the image file, or equivalently by extracting and storing in a new image file a determined subset of the data in the image file and deleting the original image file. Alternately, data in an image file may in some implementations be deleted solely by updating the bookkeeping information for the file, without moving any of the image data." And again, the key difficulties in handling of video data remain unrecognized and un-addressed in this type of system.

Castor describes a video image management system in which similar "wavelet or wavelet-like transforms" are applied to "each set of N (e.g., sixteen) successive images (i.e., frames)." More particularly "In all embodiments, the image file (or files) representing the set of frames is stored so as to facilitate the generation of smaller image files with minimal computational resources" (relative to transcoding). While this method eliminates the need for transcoding processing, it does not avoid other significant costs involved in continuous media.

The problem is that a video object of more than a few seconds will contain large numbers of GOFs. Since the layering is computed and stored on a GOF-by-GOF basis, there will be many small sets of low-significance data scattered throughout the file structure used to store the compressed video. The reduction requires "extracting a subset of the data in the set of image data structures and forming a lower quality version of the set of image data structures that occupies less space in the memory device." This means that the file must be read, restructured, and rewritten, which can be a significant cost for large files, even though the costly decompression-recompression steps of transcoding are avoided.

There is evidently no recognition that similar methods might be applied to audio, but in any case, similar problems may be expected to arise there as well. MP3 audio and similar formats are, like MPEG video, designed with real-time transmission and play as a primary objective, and thus must store all data equivalent to a "GOF" or small set of audio samples together within a short "window" period or transmission packet frame. So reducing the size of such an audio file would involve a similar elimination of low-significance layer data that is scattered throughout a large audio file, with similar processing and input/output costs.

It should also be noted that there has been attention to maintaining the ability to support functionality like that of a Video Cassette Recorder (VCR), such as random access, fast-forward, backward, fast-backward, stop, pause, step-forward, slow-motion, or other "trick" functions when using layered data formats. Consistent with the orientation of layered methods to transmission rather than storage, this has been in the context of data stored at a remote source server site and transmitted in layers to the recipient site, as in the Lin paper in the IEEE Special Issue, not the possibility of local storage at the recipient/playback site, such as is typical of a consumer VCR or DVR.

The underlying broad challenge is the difficulty of simultaneously meeting the needs of content creation, initial storage at the content or distribution source, real-time transmission and presentation to a potentially large number of distant viewers or listeners with varying communications facilities and player devices (whether by appointment or on demand, and/or batch transmission and asynchronous viewing), plus, local storage at the receiving site, and deferred presentation of stored content. The primary orientation of most work on media compression is toward the needs of real-time transmission and play, and that objective will remain critical. However, as the retention of media objects in a long-term storage system, library, or archive at the user's site begins to involve large collections and substantial resources, the problem of managing local storage over the life-cycle of media objects will also become increasingly important.

SUMMARY OF THE INVENTION

One aspect of the present invention includes a method and accompanying apparatus for managing storage capacity, wherein an object is stored in machine-readable format having at least a first layer of high-significance data and a second layer of separately-deletable low-significance data. A condition for deleting the second layer while retaining the first layer is determined and the second layer is automatically deleted upon satisfaction of the condition, whereby the object is still accessible by a user.

According to a second aspect of the invention, a method and apparatus for managing data storage capacity includes storing a plurality of objects in machine readable format having at least a first layer of high-significance data and a second layer of separately-deletable low-significance data; determining a condition for deleting the second layer from each of the plurality of objects while retaining the first layer; and deleting the second layer automatically upon satisfaction of the condition, whereby the objects are still accessible by a user.

According to a third aspect of the present invention, a method and apparatus for transmitting data includes generating an object and transmitting the object to a user in a format having at least a first layer of high-significance data and a second layer of separately-deletable low-significance data.

According to a fourth aspect of the present invention, a method and apparatus for transmitting data includes generating an object and transmitting the object to a user in a format having plurality of separately-deletable layers of data, with each layer being of progressively decreasing significance.

According to a fifth aspect of the present invention, a method and apparatus for storing an object includes receiving an object in a format having at least a first layer of high-significance data and a second layer of separately-deletable low-significance data and storing the object in a memory device.

According to a sixth aspect of the present invention, a method and apparatus for storing an object includes receiving an object in a format having a plurality of separately-deletable layers of data, with each layer being of progressively decreasing significance and storing the object in a memory device.

According to a seventh aspect of the present invention, a method and apparatus for storing metadata related to stored media objects includes identifying a location of metadata corresponding to an object having one or more layers of separately-deletable data; deleting at least one of said layers of separately-deletable data; and identifying a change in an availability of at least one remaining layer, after deleting the at least one layer.

According to an eighth aspect of the present invention, a method and apparatus for storing an object in a storage facility that may lack available space sufficient to store the object includes, prior to an object storage request, determining a set of storage units used for currently stored objects that could be reallocated without degrading any of said objects beyond specified thresholds; receiving an object storage request; storing the object in the pre-determined storage units, in response to said request.

According to a ninth aspect of the present invention, a method and apparatus for deleting at least a portion of a layered object that employs one of an index structure and a pointer structure to specify multiple orderings of storage units, includes: determining an order for storage units for an object; reading the storage units comprising the object in a predominantly time-based order; and deleting at least a portion of the storage units in a layer order.

According to a further aspect of the present invention, a method and apparatus for storing a layered object includes tracking a plurality of layers for an object, each layer stored a plurality of storage units; allowing layers to be individually marked as released; and marking a storage unit for deletion when layers stored in it are marked as released.

BRIEF DESCRIPTION OF THE DRAWINGS

Further aspects of the instant invention will be more readily appreciated upon review of the detailed description of the preferred embodiments included below when taken in conjunction with the accompanying drawings, of which:

FIG. 5 is a schematic diagram of an exemplary directory information database maintained by the user storage system of FIG. 1.

DETAILED DESCRIPTION OF THE INVENTION

Figure 1:
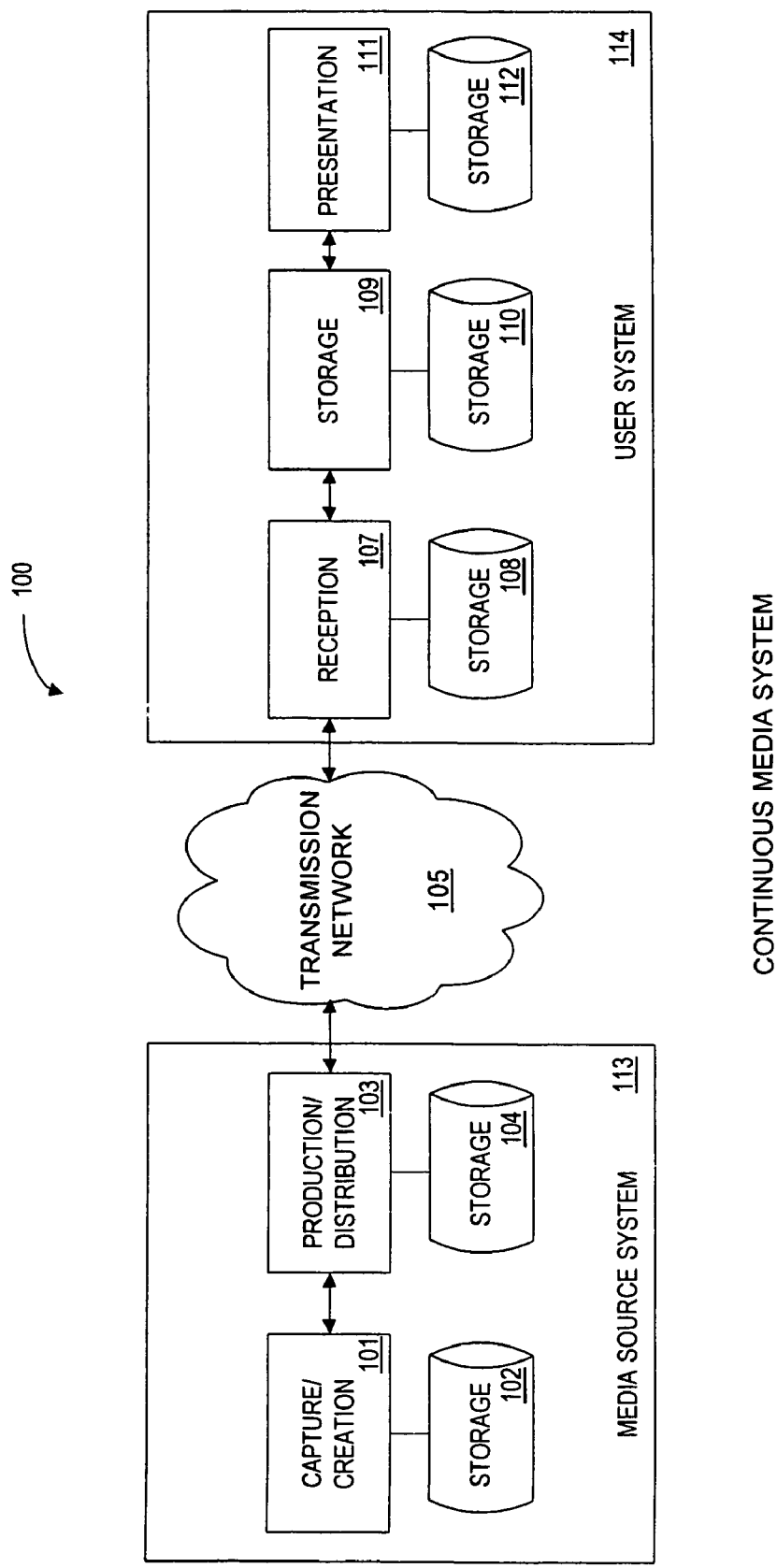
FIG. 1 is a block diagram of an exemplary user storage device, such as a networked computer or media device, and network for implementing certain embodiments of the present invention.

The present invention may be described, in various embodiments, as a system and method for storing media objects in a way that allows for the efficient progressive deletion of low-significance layers in order to reclaim storage space. The storage format and storage management methods are structured to permit quality/space tradeoffs to be made not only at the time of initial storage of the object, but at any time thereafter that a different trade-off is desired, whether because of increased need for space or decreased value of the object. The format is also structured to permit the subsequent reductions or deletions to be made with minimal processing time and cost.

It would be very desirable if a stored object could be reduced in size and quality, but still retained for future use, providing incremental ("graceful") degradation in order to maximize data storage space. This would be useful in a range of situations:

1. Portable cameras and recorders that capture media objects, but have limited storage and limited means of communication to external storage systems. Once such a device is filled at whatever selected quality/compression level was used, objects must be offloaded by transmission or removal and replacement of the storage media, or by discarding them, before any further object can be captured.
2. Portable media players have similar constraints.
3. Home (or office) entertainment and media storage systems have storage constraints that are typically less severe, and a variety of network accessible fixed or removable storage devices may be readily available, but the total number of objects to be stored may be very large. These systems may typically become archival in character, containing large and diverse collections of objects of various types, ages, and levels of importance. Both the value of these objects and the availability of storage resources will vary over time. Thus techniques for managing the use of resources to match these various and time-varying value parameters and resource constraints will become increasingly important.

In all of these situations, an effective and convenient way to alter compression levels to meet changing requirements would be very valuable. Furthermore, a consistent way to do this across a variety of file types would also be valuable as broad-function media storage systems containing varied formats emerge.

A key objective of the method is to avoid the cost of reading, separating the desired and undesired portions, reformatting, and rewriting for an entire object when a progressive deletion is to be made, and this is particularly challenging for the important case of continuous media. As described previously, this cost is incurred with current methods for storing continuous media because the portions to be discarded relate to many media segments, such as GOFs or windows, and thus are in many locations throughout the stored form of the object. The proposed method is based in part on an alternative storage structure that groups the layer data so that the parts of the one or more layers that are to be deleted together are stored together, and apart from other layers. It is preferably further based in part on matching the expected deletion actions to file system units, so that the data for one or more layers that are to be deleted as a unit are stored using the kind of storage unit, such as a file, file segment, block, or super-block, that can be deleted by the file system in use within the storage system without reading and rewriting a larger unit. (Where examples are given referring to "block," they are meant to apply to any such storage unit.)

The proposed method exploits the fact that, in well-structured file systems, much of the metadata that defines what data is stored where and in what format, such as directories of files and file allocation tables that track used and free storage blocks, may be stored externally to the data objects. When this metadata is stored externally to an object recognized by the file system, such as a block of storage, it can be changed without change to the object. Thus the object need not be read or rewritten to make such a change. The external data for managing the files may also be maintained in primary storage (a higher level in a storage hierarchy), so that secondary storage (lower level) file system changes can be made with no reading and writing at all, except for the limited writing of updates needed to protect against corruption in the event of a system failure. For example, in such a file system, a block of data can be deleted by simply removing any file directory entry that points to it, and marking the file allocation table entry for that block to indicate that it is unused. The old data may actually remain untouched until it is reallocated and overwritten with new data.

Another characteristic of file systems that may preferably be exploited to serve the needs of progressive deletion is that such metadata-based deletions may also be undone at a later time, up until the time the data unit is actually reassigned and overwritten by other data. Thus, deleted space and the corresponding content descriptors would be marked as such, but would still be potentially recoverable.

The restructuring of data effectively results in the re-ordering of data for the media object from having data for all layers of each GOF or other short segment together to having all data within a layer together. This is done without changing the data within any layer in any frame or GOF. This method is primarily described here using the example of video, such as might be coded in MPEG, but it will be clear to one skilled in the art that equivalent methods can be applied to other formats and to audio, object-based media, and other continuous media content. Also, as noted herein, and otherwise as will be apparent to one skilled in the art, many aspects of these methods are also applicable to non-continuous media, such as still images or other objects that may be coded in scalable or layered form.

It should be noted that a limited embodiment would be to perform simple truncations of data without regard to significance. One such embodiment would truncate continuous media objects in time, by simply eliminating entire time segments, such as by cutting off the end. An alternative such embodiment would truncate objects in space, such as by cropping the images of a video to remove entire areas of image, such as at the borders (like a movie cropped to fit a TV screen). Such embodiments might be more desirable than complete deletion of an object, but would normally be expected to be less desirable than the preferred significance-based methods in that such non-significance-based truncations would very noticeably alter the perceived presentation of the object, and be likely to lose critical portions.

As used herein, the term "continuous media" is meant of refer to any representation of "content" elements that continue and may change over time, including one or more of "audio data," "video data," animation, virtual reality data, hybrid natural and synthetic video data, including both "stored formats" and "streams" or streaming transmission formats, and further including "continuous hypermedia" which contain both simple continuous media and hyperlinks. Continuous media may contain descriptive metadata, time codes (such as in Society of Motion Picture Television Engineers (SMPTE) coding), and other metadata. This usage is meant to be generally consistent with the definitions contained in the W3C SMIL 2.0 specification, which defines "continuous media" as "audio file, video file or other media for which there is a measurable and well-understood duration," in contrast to "discrete media" as "image file, text file or other media which has no obvious duration."

"Video data" refers to all forms of moving-images, with or without accompanying sound, including digitally coded video, television, film, animation, virtual reality data, hybrid natural and synthetic video data, and the like. Video image data is most commonly represented as a series of still images, whether in analog or digitally coded forms, including ATSC (American Television Systems Committee), NTSC (National Television Systems Committee), PAL (Phase Alternate Line)/SECAM (Sequential Couleur avec Memoire), DTV (Digital TV), HDTV (High Definition TV), MPEG (MPEG-1, MPEG-2, and MPEG-4, and supplemented by MPEG-7 and MPEG-21, and other variations), DVB (Digital Video Broadcasting), International Telecommunications Union H.26× and H.32×, RTP (Real-Time Transport Protocol), RTSP (Real Time Streaming Protocol), SMIL (Synchronized Multimedia Integration Language), QUICKTIME, WINDOWS MEDIA, and REALMEDIA, and the like, but may also be coded as object data, including formats provided for in MPEG-4.

"Audio data" refers to all stored forms of sound, whether part of a video form or not, including digitally coded sound or music or other audio information in formats such as PCM (Pulse Code Modulation), CD-AUDIO, MP3, REALAUDIO, MIDI (Musical Instrument Digital Interface), and the like. Audio data is most commonly represented as amplitude data over time, whether in analog or digitally coded form, although object data can also be represented, such as using MIDI.

Animation or virtual reality data is commonly represented in various image-like forms, raster or vector graphic forms, or as object-based structures, such as scene graphs, including SHOCKWAVE FLASH (including SWF and Open SWF), SVG (Scalable Vector Graphics), VRML (Virtual Reality Modeling Language), RM3D (Rich Media 3D), and MPEG-4/BIFS (Binary Format for Scenes), Computer Aided Design (CAD) or wireframe animation, and the like.

Another important media content type is still images, including photographs, drawings, cartoons, diagrams and facsimiles, which may be coded in such formats as JPEG (Joint Photographic Experts Group)/JFIF (JPEG File Interchange Format), GIF (Graphic Interchange Format), TIFF (Tagged Image File Format), PTP (Picture Transfer Protocol), including object formats such as CAD and the other object formats listed above, and the like.

A further common media content type is text, which may be coded in such formats as ASCII (American Standard Code for Information Interchange), HTML (Hypertext Markup Language), DHTML (Dynamic HTML), XHTML (eXtensible HTML), PDF (Portable Document Format), SGML (Structured Generalized Markup Language) word processing formats, and the like. Other media content includes active formats, such as spreadsheets, for example.

"Media content" is used herein to refer generally to any content, or information that is understandable to humans. "Content" refers to any form of transmitted or stored information. "Objects," when used in the context of stored content objects refers to any content item or element or grouping of items or elements, including objects within a file, and objects stored as files or sets of files. When used in the context of object-based media formats, the term is meant herein to be used in accordance with the definitions applicable to such formats.

"Storage" as used herein is meant to refer to the process of storing information or content for future use, or to any memory, "storage device" or "storage system." "Storage system" refers to any device or any combination of one or more devices with software that supports the use of storage, including Storage Area Networks (SANs). "Storage device" refers to the element or elements of a storage system that include actual fixed or removable "storage media" capable of retaining content in an electromagnetic or other machine-readable form using any technology, including electronic, magnetic, optical, time-delay, molecular, atomic, quantum, transmission-delay and the like, including all future storage technologies. Unless otherwise indicated or clear in context, "electronic storage" and "electromagnetic storage" are meant to include all such technologies without distinction. Storage systems may be embedded into specific media devices, such as cameras, DVRs (also called Personal Video Recorders or PVRs), televisions (TVs), cable or satellite set-top boxes, music players, and the like, or may take the form of a general purpose storage system for use with varied content types, both media and otherwise, and with varied media or other devices, such as home or office gateways, storage server systems, or "archiving" systems. "Archiving" refers to the retention of collections of objects over extended periods, and to associated methods for managing the objects and their storage and use. Unless otherwise indicated or clear in context, archival is used as inclusive of all components of a storage system that may have archival functions, including file servers, and not limited to components specific to long term storage.

"Storage time" may refer to the time at which an object is stored or to the duration of time needed to complete a storage operation. "Memory" may be used synonymously with storage. "Hierarchy" relates to the linked use of multiple storage technologies having complementary performance/cost characteristics, such as high-speed memory caches, hard disks, and low-cost removable media, and the related control methods of hierarchical storage management (HSM), including those used in prior enterprise data center hierarchical storage systems.

"Transmission" as used herein is meant to refer to any form of "communication" or "transport," including directly attached devices in operative communication, local area networks (LANs) including home and office networks, and wide area networks (WANs). Transmission may be over any suitable medium, including the Internet and World Wide Web, cable and wireline networks, ATM (Asynchronous Transfer Mode) networks, fiber-optic networks including use of SONET (Synchronous Optical Network), satellite and terrestrial fixed and mobile wireless networks. Local network technologies may also be used, including wired or wireless LANs and HANs (Home Area Networks). While normally intended to move information from one place or device to another, transmission may also be used as a means of storage. Transmission protocols may include IP (Internet Protocol), TCP (Transmission Control Protocol), UDP (User Datagram Protocol), SCTP (Stream Control Transmission Protocol), RTP, RTCP (RTP Control Protocol), RSTP, IP Multicast, ASF (Advanced Streaming Format), ATM, Ethernet, GSM (Global System for Mobile Communications) and similar wireless protocols, DSM-CC (Digital Storage Media-Command and Control), DMIF (Delivery Multimedia Integration Framework), and many other current and future protocols, and use either baseband or broadband signaling. Transmission is typically to a network node address, examples of which are IP addresses, and logical addresses, such as URLs (Universal Resource Locators) and URIs (Universal Resource Identifiers)/URNs (Universal Resource Names). Transmission may be characterized by bit rate and Quality of Service (QoS), as well as many other parameters. Unless otherwise indicated or clear in context, transmission is meant to include physical transport of storage media.

"Compression" as used herein is meant to refer to any form of information representation or "coding," whether for storage or transmission, intended to reduce the resources needed to store or transmit the information.

"Coding" refers generally to any type of data representation, and may be used to refer implicitly to codings that achieve compression, such as Huffman or entropy codings. In digital formats the resources typically relate to the number of bits or bytes needed to store or transmit the object, and reductions are typically achieved by various transforms that convert data into more efficient codings. All references to binary formats and bits are meant to be inclusive of alternative data codings that employ multiple valued devices and logics, as well as transmissions using multiple signaling elements.

"Decompression" and "Decoding" refer to the reverse of compression or coding, typically by use of inverse processing or transforms. "Lossy" compression refers to the use of processing in which the inverse does not fully recover all information from the original, whether the data is lost by explicit discarding or by implicit transformations, and "lossless" refers to compression that does not lose such data.

"Transcoding" refers to any transformation from one coded format to another that involves decoding and recoding, which may include such steps as resampling, mathematical transforms (such as discrete cosine transforms, wavelet or wavelet-like coding, and fractals), quantization and entropy coding.

"Layering" as used herein is meant to refer to the ordering and/or separation and/or grouping of compressed data based on the "significance" or importance of the data to the quality of perception of the decompressed result. Data is separated into a base layer (BL) and one or more enhancement layers (EL). The characterization of coding as "scalable" or "embedded" are understood as generally equivalent to layering for the purposes addressed herein. Layering may be based on frames or samples or sampling rates or bit-depths or other aspects of coding, which can vary quality in terms of such factors as resolution or fidelity, and may involve discrete layers stored as distinct elements or to simple orderings or logical separation of layer data within an object. "Significance" may refer to either or both of mathematical significance or subjective perceptual significance. "High-order" or "low-order" may be used synonymously with "high-significance" or "low-significance," respectively. Scalability may relate to multiple content attributes, including temporal, spatial, and quality. "Fine Granular Scalability" (FGS), refers to the scheme by that name proposed by Radha, and similar methods, and a variation on this is Progressive Fine Granularity Scalability (PFGS). Depending on context, "quality" as used herein may relate to objective measures such as signal-to-noise-ratio (SNR) or to subjective measures of perceived quality or fidelity, including both broad and specific metrics. Quality may be specified in terms of equivalent or related metrics, including number of layers, amount of space, fraction of space, amount of quality, fraction of quality, arbitrary quality units or "quality factors" and the like. Unless indicated otherwise, examples given in terms of one such metric are meant to include alternative metrics as well. As the benefits of techniques such as those disclosed here become understood, it may be expected that the use of scalable or layered formats will spread and will come to include media types which are not commonly coded in scalable forms at present.

"Progressive" refers to coding schemes that may layer data for successive transmission and presentation at progressively improving quality, or to the progressive deletion of one or more of said layers as described herein. Unless otherwise indicated or clear in context, "progressive" as used herein does not refer to interlacing techniques, such as the physical screen raster scan sequence distinction of progressive versus interlaced scans.

"Progressive deletion" is meant to refer to the discarding of data in a progressive manner, allowing for one or more deletions of data while retaining sufficient data to maintain a reduced quality result, in a process that results in "graceful degradation" (much as the term usually refers to degradation of a system in such a manner that it continues to operate, but provides a reduced level of service rather than failing completely) with regard to the quality of the object over time or as available data storage space decreases. Progressive deletion typically discards low-significance data in preference to high-significance data. The data ordering suited to progressive deletion may be referred to herein as "archival order."

A "group of frames" or "GOF" refers to a number of frames (or pictures) that are treated together for effective representation of inter-frame differences, such as due to motion. Such GOFs are typically on the order of 16 frames, but larger GOFs may be used by more advanced algorithms or as processing economies improve. A GOF is typically short relative to the duration of an extended video sequence. The frames within a GOF typically include key frames (or I-frames) and non-key frames, including those (P-frames) that are coded in reference to a previous frame and those (B-frames) that are coded to be bi-directionally predicted or interpolated. A "window" refers to a set of samples that are treated together in coding processing, and thus generally analogous to a GOF, such as for audio data, which may consist of a series of amplitude samples. Codings may also address inter-GOF or inter-window relationships. A "media segment" refers to any time-continuous portion of a continuous media object.

"File" as used herein is meant to refer to generally to a media or data object, but may more particularly refer to a discrete object as handled by a storage system. "Stream" also refers generally to a media or data object, but may more particularly refers to a technique for transferring data such that it can be processed as a steady and continuous stream. "File" and "stream" may be used here interchangeably except where a more specific meaning is appropriate. Streaming is commonly used for the transmission of continuous media. This may be in a format intended only for real-time presentation that is not intended to be stored, but may also include formats that may be stored for future use at the receiving site, and such streams may be contained in a file and advanced file systems may provide for support of streams as objects within files. Continuous media may be transmitted as a stream, and individual layers may each be transmitted as a stream. Continuous media may also be stored as a Binary Large Object (BLOB). "File structure" is used to refer to schemes for structuring data within a file, such as into streams or objects, as well as for structuring data across groups of files. "File structure" may also refer to the structuring of groups of files themselves, and the "metadata" that describes those files, including such metadata structures as file tables and directories, File Allocation Tables (FATs), inodes, and indexes. "File structure element" refers to a grouping of data elements possibly including attendant metadata, including, but not limited to those that may be made to correspond to a physical storage unit, such as a file, file segment, block, segment, cluster, extent, or super-block. "Storage unit" is meant to refer to any such unit that is readily manipulated. "Input/output," "input operation," and "output operation" refer to physical reading or writing to or from a storage device. "File system" refers to the software facilities that support the use of files and file structures, whether standard operating system facilities or a supplementary package or built into a specialized systems or application software system, and is meant to include virtual file systems. File, file system, and file structure are also meant to be inclusive of "data base systems," including relational data bases, object data bases, and object-relational data bases, and inclusive of "directory systems," including those based on LDAP (Lightweight Directory Access Protocol).

"Deletion" as used herein may refer generally to the removal or erasure of data from all or part of an object. Deletion usually entails attendant reduction and release of storage space used by the object. More particularly, in the context of the stored form of an object with regard to a storage system and the file structure elements and storage units that contain it, "deletion" refers to a deletion of one or more contiguous elements without removing any of the remaining data, such as might preferably be done at the file structure or storage system command level and result in the release of the associated physical storage space. In this context, "erase" may be used synonymously with delete.

"Metadata" refers to data about data, including descriptors of data content and of data format and "program information." Metadata formats (that are general purpose or related to media content) include XML (eXtensible Markup Language), RDF (Resource Description Framework), SDP (Session Description Protocol), SAP (Session Announcement Protocol), MIME (Multipurpose Internet Mail Extensions), MPEG-7, MPEG-21, SMPTE time codes, ATSC-PSIP (ATSC-Program Service Integration Protocol), DVB-SI (Digital Video Broadcast-Service Information), and SMIL, as well as data contained in Electronic Program Guides (EPGs).

"Multicast" as used herein is meant to refer to the transmission of data to a defined group of recipients. Internet multicast protocols, such as supported by the Internet Multicast Backbone (MBone) and IP Multicast, provide for this in the form of a stream or channel to which recipients may subscribe. Multiple related multicast streams may carry related data, such as in the case of a RLP "layered multicast," where a base layer channel and some number of enhancement layer channels contain partitions of the layered content data.

When used herein to describe entertainment system elements, "system" may refer to all elements of the entire network from capture or creation to presentation, including elements at many sites, or to elements at one stage or one site, or to individual subsystems. "Subsystem" is meant to refer to elements that are typically specific to some function or task, but such elements may also serve as a complete system. Usage of "system" and "subsystem" and similar terms may suggest typical differences, but are not meant to be limiting, and such terms may generally be equivalent, especially given the broadening usages and convergences of technology and products applicable to this field.

"Server" and "device" are also used as equivalent to system or subsystem. "Server" may be suggestive of elements that may provide services to other elements, possibly on a shared basis, and "device" may be suggestive of packaging as a discrete hardware component or product. Future systems and subsystems may include components and services that are provided in software form, much like PC applications.

"Consumer," "user," and "end-user" as used herein are meant to be generally equivalent in referring to individuals, including small groups of family members or of office workers, especially those who frequently share a common base location at which a user system might be located.

"User system" as used herein is meant to include any kind of system that might be usable for reception, storage, and/or presentation of media content by users of such content.

The specific formats, standards, protocols, algorithms, and the like listed here are meant to be exemplary, and applications to other similar formats, standards, protocols, algorithms, and the like are intended. Where examples are given in terms of one class of media, system, format, and the like, they are meant to be representative of equivalent cases for other applicable classes.

Referring now to FIGS. 1-7, wherein similar components are referenced in like manner, various features for a method and apparatus for progressively deleting media objects from storage are disclosed.

Turning now to FIG. 1, there is depicted an exemplary computer or media device network 100, which includes a transmission network 105 providing transmission services through which one or more user systems 114 having subsystems for reception 107, storage 109, and presentation 111 may communicate with one or more media source systems 113 having subsystems for capture/creation 101 and production/distribution 103. Each of the subsystems for reception 107, storage 109, presentation 111, capture/creation 101 and production/distribution 104 may have corresponding storage subsystems for storage of associated media content. The detailed structure of these subsystems is not essential, and may involve finer breakdowns or specialized subsystems, such as for the separate common storage subsystem 109, with its storage devices 110 that serves both reception and presentation subsystems, or combinations of the subsystems shown here into combined elements, such as for reception, storage, and presentation, such as current DVRs. For simplicity, the various subsystems 101, 103, 107, 109, and 111 will be considered to include any associated storage devices 102, 104, 108, 110, and 112 respectively, except where the context indicates otherwise.

Various elements of the user system 114 may be embodied in the wide range of current and future devices for use of media, such as set-top boxes, DVRs/PVRs, advanced/digital TVs, PCs, PC-DTV (Digital TV) devices, audio systems and recording devices, home entertainment systems, game systems, telephones/videophones, home gateways, portable audio/video/media/game devices, including Personal Digital Assistants (PDAs), telephones, music players, remote controls, and server devices that perform such functions, both individually and in combined configurations. The methods described here apply to all such current and future variations in the configuration of the basic functional components described here with minor variations that will be apparent to those skilled in the art.

Preferably, advanced user systems would make use of a common media storage and archiving system, as a function-rich embodiment of storage system 109, that takes content objects as they are received by one or more reception subsystems, maintains them using one or more storage devices, and makes them available to one or more presentation subsystems. Such a configuration might minimize or eliminate need for separate storage devices for reception 108 or presentation 112, and might provide for greater economy and functional richness.

The user system will preferably serve co-located users at a home or office, and thus avoid the constraints, complexities and costs that usually relate to wide area transmission. Remote access may also be provided. Such access would preferably be handled as secondary, as a means to support remote use, including access to stored media, by users who may be temporarily away from the base location, as well as supporting some remotely-based users on a supplementary or occasional basis. The user system might also be portable or mobile, including wearable systems.

The elements just described may use any technology suitable for the handling, storage, and communication of media content, include all network and transmission technologies currently used for media, and presumably all future such technologies. Network 105 may preferably include a combination of available methods, including all transmission technologies listed above. The various storage devices listed may include any suitable technology, including all those listed above. The user system 114 and its component reception 107, storage 109, and presentation 111 subsystems may include any device available to consumers (or business end-users) providing such functions. Such devices will include the full range of components suited to such devices, including CPUs and other processors, clocks, various specialized logic processors, including, CODECs (Coder/Decoders), DSPs (Digital Signal Processors), ASICs (Application Specific Integrated Circuits), caches, RAM (Random Access Memory), ROM (Read-Only Memory), and other memory and storage devices, including the various forms listed above, buses and connectors, various transducers for local and remote communications and device interfacing, including radio frequency (RF), Infra-Red (IR), fiber, coaxial cable, telephone cable, multiplexors/demultiplexors, and modems or other analog-to-digital converters. Such systems and subsystems will also employ any suitable software technologies and operating systems, including computer operating systems such as WINDOWS, UNIX and LINUX, embedded operating systems such as WINDRIVER VXWORKS, MICROWARE OS-9 and DAVID, as well as other system software such as JINI, Web servers, Web services, agent systems, and programming languages and environments, such as JAVA, C, C++, C#, J2ME, and the like. Standard file systems and database management systems may also be employed.

Media sources may include any suitable source of content, such as for example broadcast television, cable television, satellite television, digital television, Internet broadcasts or multicasts, World Wide Web, digital video discs (DVD), still images, video cameras, laser discs, magnetic media, computer hard drive, video tape, audio tape, data services, radio broadcasts, or any other form of communications or distribution. It should also be understood that there may be variations in sourcing. For example, the source may be local to the user system, such as in the case of a camera, thus requiring only local transmission among sub-systems. Also, for example, the content may be obtained on a physical medium, such as videotape or DVD, which also can be thought of as substantially equivalent to a local source. Media source systems 113 and their component capture/creation 101 and production/distribution 103 systems may be of any suitable technology and configuration, including all of the alternatives described above for user systems 114, and may include hardware and software configurations suitable for personal/home use, as well as server systems, including large scale configurations for media production and serving, as are well known in the art.

Although the embodiment described herein involves components of typical media systems and computers and network servers, other existing or future technologies that perform similar functions may be employed. One such variation is the use of so-called "web services" or other distributed service technologies in which functions typically performed by a single server complex operated by a single enterprise may be "distributed" so as to integrate component services provided on remote servers operated by independent enterprises into a cohesive "virtual server" offered by the combined "virtual enterprise." A similar variation is the use of "application service providers" (ASPs) to outsource services, whether personal or business.

Also clearly intended is the use of multiple cooperating servers, as well as the use of multiple cooperating client systems and peer-to-peer architectures, as well as the use of mobile agent technologies. Variations may include assemblages based on combinations of downloadable programs, plug-ins, applets, aglets, or other distributed components and the use of removable components such as smart cards. Future embodiments of media source and user systems may be based on a wide spectrum of intelligent devices including cell phones, PDAs, wearable computers and sensors, and the like, and may involve mobile applications that move from device to device, as needed.

It is also to be understood that while the discussion herein is in terms of conventional electronic digital computer systems, future equivalent technologies might also be used. Such alternative technologies might include optical, photonic, quantum, molecular, or organic computing systems, and the like. Accordingly, references herein to electronic technologies are meant to be inclusive of embodiments based on such future technologies as well.

System elements will preferably conform to formal or de-facto standards, such as OpenCable, Open Services Gateway Initiative (OSGi), Universal Plug and Play (UPnP), Home Audio/Video Interoperability (HAVi), Video Electronics Standards Association (VESA), Architecture for HomeGate (AHRG), AUTOHAN, MHP (Multimedia Home Platform), DASE (Digital TV Applications Software Environment), and the like. Digital Rights Management (DRM) technologies may be provided, including devices for decryption and for identification of users and their entitlements, including OpenCable Point-of-Deployment (POD) modules, smart cards, or others.

Figure 2:
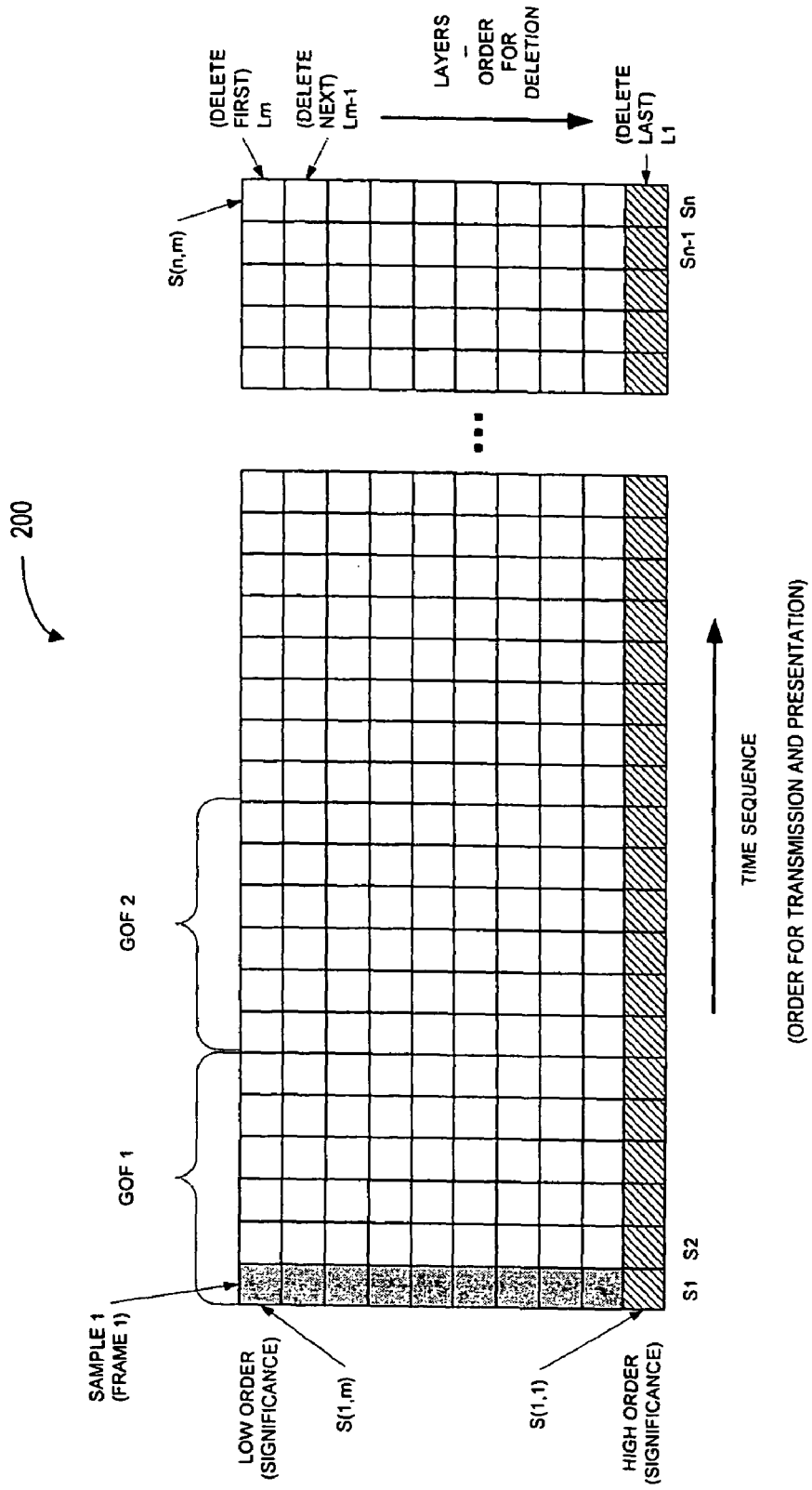
FIG. 2 is a diagram of an exemplary media data format for the network of FIG. 1.

Turning now to FIG. 2, displayed therein is depicted an exemplary storage structure of a continuous media object 200. The object is divided into n frames or samples S1, S2, . . . Sn, that represent elements of content at moments in time These frames or samples are grouped into defined segments, such as GOFs or windows, shown as GOF1, GOF2, . . . , etc. This horizontal structure follows the inherent time-based structure of the media content, corresponding to time running from left to right (as diagrammed here), that applies to both transmission and presentation. Standard compression techniques deal with these elements, typically compressing each GOF independently, but optionally adding some data on GOF to GOF changes.

The layering of the data is shown in the vertical dimension, with a high significance base layer L1, and additional enhancement layers L2 . . . Lm of successively lower significance. Layer L1 is essential to presentation, but all other layers are supplementary. Depending on the specific compression method, data would typically be layered on a frame by frame basis, with successive layers for frame 1 shown here as S(1,1), S(1,2), . . . S(1,m).

Many compression algorithms apply motion compensation across the frames within each GOF. In this case the data for the initial or key frame of a GOF will usually be complete, but data for other frames (i.e, enhancement frames) within a GOF may be reduced to contain only difference data relative to the key frame. This might apply to both BL and EL data. Thus the data for frame S2, and other non-key frames within GOF1 may not be usable without also having the data for frame S1.

To provide a simplified but more concrete example (which may differ in details from any actual media content), for video there might be a video motion rate of 30 frames per second. Each frame might average 100K bytes, and if layered into ten layers, the data for a layer of a single frame, S(i,j) might average 10K. A 16 frame GOF might then contain 1,600K bytes. Data for key frames would normally be more voluminous than for non-key frames.

In a conventional layered transmission, data would be sent in accord with the horizontally depicted time dimension, since that permits real-time presentation. In real-time presentation, all data layers to be presented for a given frame must be received before that frame is presented, or they will no longer be of use. Various alternatives, such as the motion compression just described, may involve interdependent groupings of data across frames, but together within GOFs or other small segments. For non-key frames, such as for example for frame S2, much of the data may be predicted from data for the preceding key frame (S1), so only a few motion adjustments need be transmitted. In any case, all data for a relatively short segment of time must be transmitted close together in time to allow for real-time presentation. Thus, data to be transmitted is stored in this left to right order, at least at the GOF or segment level, and in conventional systems such data is stored on the receiving end in the same order.

In such conventional modes of storage, each GOF or window contains all data for some segment of time and so the desired top layer data is scattered throughout the object, and cannot be deleted without reading the object, reformatting it to remove the one or more top layers, and rewriting the resulting smaller object. This may involve one or more storage blocks or other units, but still crosses portions of all the units (samples, frames, GOFs, windows, segments, etc.) that comprise the object.

What is needed in order to enable progressive deletion is to store the data in a layer-by-layer sequence, so that an entire layer can be deleted in the fewest possible operations. Following FIG. 2, this reorders the data into a bottom-to-top vertical order, going from Layer 1 for all frames in an extended segment, to Layer 2, and in turn, to Layer m. In such a structure, all data for a single layer Lm or for some number of multiple layers Lm, Lm−1, . . . can be efficiently deleted.

Preferably each layer is stored in a separate file, or storage block, or other storage unit that is readily deleted using the facilities of the file system in which the data is stored. It is further preferable that that unit be of a kind, such as a file, that is managed in terms of metadata, such as file allocation tables, that can be deleted by the file system merely by changing the metadata to mark it as deleted, without need to read and rewrite any of the actual data. Similarly, any directory structures that are used to relate the component portions of a data object (whether external or internal to the file system) may also be structured so that deletion of one or more layers does not require reading and rewriting of the object. This can be accomplished in a variety of ways that will be apparent to one skilled in the art after review of the discussion herein, such as by using separate directory metadata files structures that are external to the content objects. Alternatively, if such directory data is to be stored within the object, it may be structured so that at most one read/write operation is needed to update the layer directory information. In large objects composed of multiple storage units, this can be done in a variety of ways, such as by placing all such data in one block (such as the Layer 1 block), or by chaining the data so that only one block in the last layer retained need be updated to indicate that no further layers exist. Such methods can preferably be forgiving of losses of access to directory data or incomplete updating of chains stored with the object (whether by failures or by export of incomplete data) by using chaining or directories of layers that run from high to low significance, and use as many layers as can be found, assuming that any additional low significance layers not found have been deleted.

It should be noted that a layer need not be stored as a single file or other storage unit, but depending on the size of the content object and the desirable parameters of the storage system, may be broken into multiple files or storage units. Alternatively, with appropriate structures and facilities for efficiently managing storage and deletion, as described below, the multiple layers may be stored within a single file unit. Also, the orderings described here need not always correspond to physical order on a storage device. If the storage system provides for efficient mappings of logical data structures to physical data structures, it sufficient that the logical data structure be provided as described. Thus, a storage system may permit logical groupings, such as index lists of blocks or block pointers that facilitate scatter reads and writes, and/or bulk deletion of all blocks for a given layer. In this case the reordering described here may be accomplished by logical manipulation of pointers rather than physical reordering, and this may be done by creating directory entries that specify the sequence of all blocks that make up a given layer.

Figure 3:
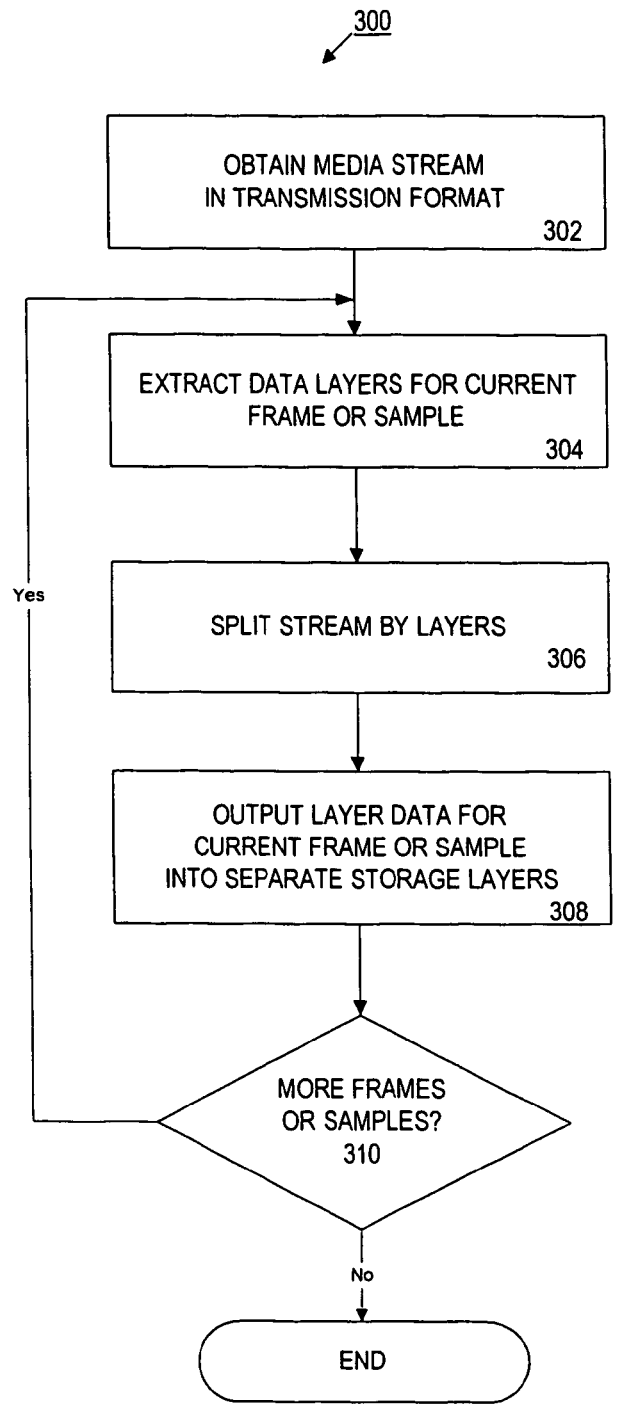
FIG. 3 is a flow chart of an exemplary process, performed by the user storage system of FIG. 1, for storing media data according to certain embodiments of the present invention.

Referring now to FIG. 3, therein is depicted an exemplary process 300 by which a reception device 107 or associated storage system 109 may convert a media object received in conventional format to the storage format suited to progressive deletion, such as that in FIG. 2. The process begins with the receipt of a media content stream in transmission format (step 302). The input stream is processed to isolate each frame or sample in turn (step 304), and to further extract each data layer (step 306). The output storage structure is then created by outputting the data for each layer into separate files or storage units (step 308), using buffering techniques as appropriate. This process preferably continues until all frames or samples have been processed (step 310). Upon completion of all of the frames or samples, directory entries are recorded and the resultant output files are closed (step 312).

During this process, the output data may be collected in buffers as each frame or sample is processed to avoid unnecessary input/output activity. Actual writing of file outputs to the storage device would preferably be done only at the completion of a data block or when the data for the object is complete. The result is a stored format that is structured to facilitate progressive deletion.

Figure 4:
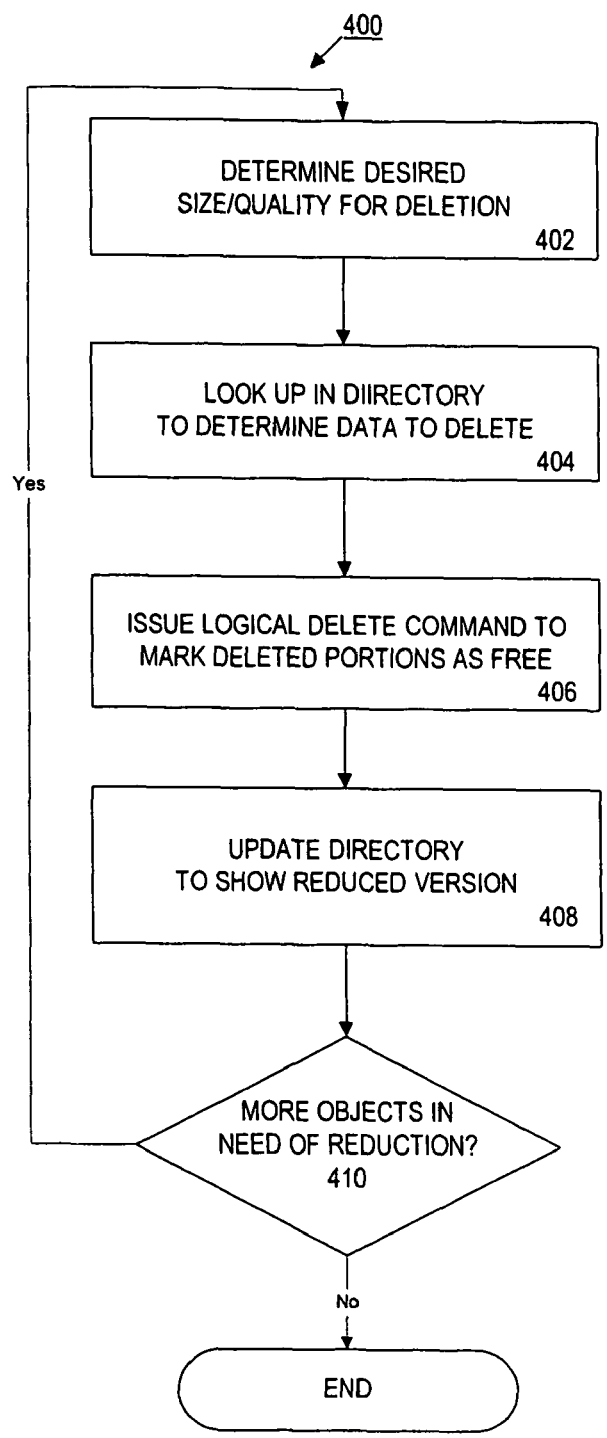
FIG. 4 is a flow chart of an exemplary process, performed by the user storage system of FIG. 1, for progressively deleting media data according to certain embodiments of the present invention.

Turning now to FIG. 4, therein is depicted an exemplary process 400 by which a progressive deletion action is effected. The process begins in response to a request to perform a progressive deletion action, and starts with a determination of how many layers are to be deleted, based on the size or quality reduction desired (step 402). Next is required a determination of which one or more storage units are to be deleted, which may involve the lookup of relevant details in a directory (step 404). The directory may be internal or external to the stored form of the object, as outlined previously. This example assumes it is external. Commands are then issued to the file system to effect deletion, which preferably is done by marking the deleted storage units as free (step 406). Finally relevant directories are updated to correspond to the reduced version of the object (step 408). The process is repeated if additional progressive deletion actions have been requested (step 410). The result is the progressive deletion of a low-significance portion of the subject media content object.

Referring now to FIG. 5, therein is depicted an exemplary directory structure 500 that may preferably be used to track the relevant metadata describing stored media content objects that are managed by a storage subsystem which provides for progressive deletion. Such a structure may contain the information needed to perform progressive deletion, as well as information for a wide variety of other storage and archive management tasks. Each media content object is shown as having one or more row entries in this structure, one for each layer that is stored. For each such entry, the columns show data elements that may preferably be maintained. Each content item may be identified by an item Name field 502, an item Type field 504 which may specify the nature of the item, and a Description field 506, which may include data indicating the object's source, content, subject, and format. More precise specifications of the data stored in Coding Format field 508 may be included to control processing. Each layer may be further described by Layer number field 510, which may also contain an indication of which layer is the last maintained (shown here as a "*"). Layer size field 512, may be in such units as bytes or blocks. Layer quality field 514, may be in any scale, such as a percentage or an arbitrary quality level. Layer filename field 516 may point to the file or other storage unit of object content. Finally, Status field 518 may indicate if the layer is saved or deleted (and may also indicate which layer was the last maintained). A directory structure of this kind conveniently organizes the basic information needed to support progressive deletion, and can also provide the base for a wide variety of additional functions related to the management of an archive of media content for a user or group of users, in either a home or business context. Preferably relevant standards for multimedia metadata, such as MPEG-7, will add support for metadata supportive of progressive deletion, such as the elements just described. It is to be understood that such a directory structure may include the data itself or include links to the data, and that it may be stored in a file structure, database system, or directory system, and that it may be distributed across multiple sub-structures, sub-systems and storage devices, as desired. It should further be understood that such a directory structure may desirably be integrated with other kinds of directory data and metadata relating to the media objects.

Figure 6:
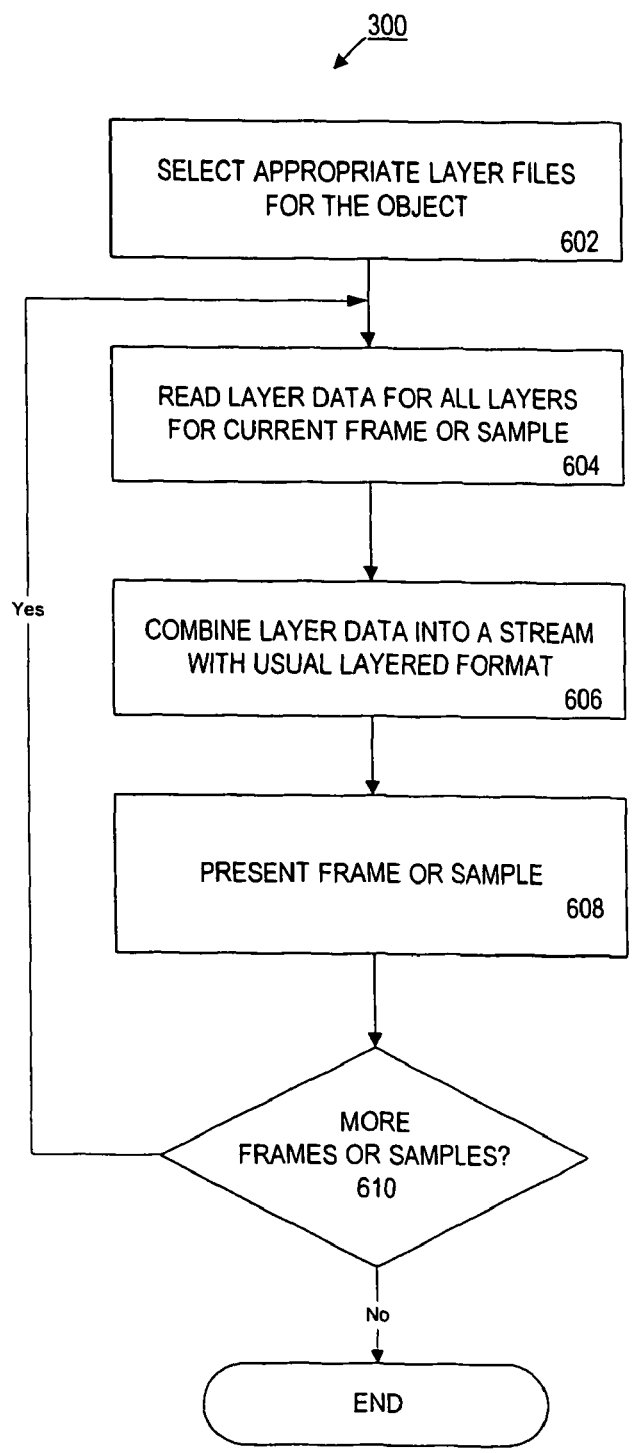
FIG. 6 is a flow chart of an exemplary process, performed by the user storage system of FIG. 1, for retrieving media data according to certain embodiments of the present invention.

Turning now to FIG. 6, therein is depicted an exemplary process 600 by which a presentation device 111, or associated storage system 109, may retrieve and present a media object retained in the storage format suited to progressive deletion. Using any necessary directories or other metadata, such as described in FIG. 5, the playback system selects all available retained files that are appropriate for presentation of the desired object (step 602), preferably ignoring any layer data not suited to the desired playback system. For each current frame or sample in turn, the corresponding data from each such layer is read (step 604), and combined into a stream segment of the usual format (step 606). It will be understood that just as these methods for reordering data maintain and re-establish time-based relationships at the frame or sample level in accord with the steps described here, similar relationships at the GOF or window (or other segment) level that relate to inter-frame or inter-sample data will be similarly maintained. The data is then presented in time sequence (step 608). This process repeats until presentation completes (step 610), after which the files are closed (step 612), and any housekeeping tasks are completed. Again buffering would be used as appropriate in reading files and in passing data from storage system to presentation system components.

Preferably the playback system would support VCR-like functionality, such as random access, fast-forward, backward, fast-backward, stop, pause, step-forward, slow-motion, etc. It will be apparent that these functions can be provided in accord with the proposed layered storage structure using steps similar to those just described to coordinate the retrieval and combination of the multiple layers of data to reestablish time-based relationships.

Specific formats for the coding of media streams may vary in the details of their structure from the example described. One such variation may depend on such factors as the use of quality/SNR, temporal, or spatial scalability. For example temporal scalability may allow the presentation frame rate to vary, including key frames (as base frames) in the base layer, but treating all data in non-key frames (or enhancement frames) as enhancement data that may be dropped entirely. Another variation may relate to the use of object-based codings and associated metadata, which may also be scalable and layerable, but in this case at an object level, such as may be described by metadata when an object first appears (or undergoes a significant change), rather than at a frame or GOF or even segment level. The need for and methods of the reordering will be substantially as described here, relating to the shift from a primarily time-oriented ordering suited to realtime transmission and presentation to a primarily layer-oriented ordering suited to progressive deletion, with appropriate minor variations as will be apparent to one skilled in the art. Integration with any DRM systems would preferably be provided using the methods usual for other media storage and retrieval systems.

Numerous variations on and extensions of these methods will be apparent to those skilled in the art and will become practical as the use of various digital content forms develops, becomes more widespread, and converges onto a compatible suite of devices and systems.

One set of variations will depend on the nature of the media content, and the form of transmission offered. The examples used above deal primarily with data transmitted without regard to how layers might be used, and without anticipation of the use of progressive deletion at the receiving end. In such case, all of the actions described to convert such content to a format better suited to progressive deletion must be performed at the receiving end. Preferably media content sources would be aware of the desire to apply progressive deletion and might take measures to facilitate storage by the receiver in a desired format.

One set of such embodiments would be to provide a deletion-oriented format from the source. This might be of limited feasibility for content that is transmitted in real time, for the reasons given earlier, but might be done to varying degrees in some cases. In the case of content that is not provided for presentation in real time, but is provided for download and subsequent play, there would be no need for the usual real-time time-sequence order, and the provision of such content in the layer-by-layer order suited to progressive deletion could be offered. The same would apply to content that is provided by physical delivery on storage media.

Another such embodiment would apply to the case of transmissions that employ layered multicast. As described previously, RLM layered multicast techniques transmit multiple layers as separate parallel streams such that the streams are synchronized to permit a receiver to obtain the number of layers desired and to combine them in real time for presentation at the desired quality level. That synchronization would be close enough to avoid need for excessive buffer storage at the receiver. Existing layered multicast methods do not consider the possibility that layers might be stored for future use, nor do they anticipate that they might be progressively deleted, but they do separate the layers just prior to transmission in a way that is similar to the format described here. To adapt such transmissions to use in a storage system that permits progressive deletion as proposed, the receiving system would not combine them on receipt, as would ordinarily be done for presentation, but instead, each layered stream that is received would be kept separate, and be stored into separate storage units, using such separate buffers as might be needed to do that efficiently. This may be done using methods similar to those detailed above in the discussion of FIG. 3, except that instead of obtaining a single stream and splitting it, the content is received in the form of multiple streams that have already been split, and the task is one of storing it as described in step 308. Thus buffers may be provided for each layered stream as it is received, and writing would proceed as the multiple layer streams are received. Once stored in this fashion, the subsequent progressive deletion actions can be performed in the same manner described previously. Preferably such a system might also be able to combine the streams in the usual manner as they are received to allow real-time viewing while recording, in a step additional and concurrent to the storage steps described here that would provide for storage, deferred viewing, and progressive deletion.

As the use of progressive deletion becomes commonplace, content sources may preferably provide content in forms that facilitate it. For example, the layer data in a media object 200 may be structured to package layer data to facilitate reformatting and storage in the reordered form desired for progressive deletion. This may include control of layering methods to 1) provide chunks of data of a size and uniformity that is well suited to storage in reordered form, 2) select layer data sizes that match to intended storage unit sizes, and 3) use coding formats that are well suited to the reordered format. The selection of layer numbers and sizes may be done based on criteria that optimize not only for transmission and playback, but also for reordering and storage in the layered format suited to progressive deletion. In the case of layered multicast, similar considerations would be given to layering schemes that optimize not only transmission but retention and progressive deletion. In the case where content is to be both transmitted in layered multicast and delivered via download or in physical storage media, the layering parameters would preferably be selected to be suited to both uses.

This balancing of transmission and storage performance objectives may involve many trade-offs. As described, variability in transmission argues for Fine Granular Scalability, effectively creating a single enhancement layer with an internal order, while storage management efficiency may argue for a small number of discrete enhancement layers. The problem is that most storage management systems and storage devices are not efficiently operated in a fine-grained way. Storage is typically organized into fixed sized blocks for efficiency of I/O operations and space allocation management. Variable sized blocks and byte-addressability have been accommodated in some storage systems (disk and flash), but this can result in inefficiency in storage use and performance. A solution may preferably be to transmit in FGS format, and then partition that FGS enhancement layer into the number of layers suited to the storage system at the receiving end, again following the methods described in FIG. 3. Alternatively, more advanced codings, such as PFGS, which seek to obtain the transmission efficiencies of FGS (fine granular bit-rate scalability, channel adaptation, and error recovery) in a multiple EL format may help address these trade-offs.

The desired number of layers for the stored format would be set based on a combination of the following factors:
  Storage coding efficiency of the resulting content
  Processing resource issues in coding, decoding, and reordering
  The layering structure already provided in the content as received
  Desired granularity for deletion
  Basic file system parameters of physical and logical block sizes, and their performance effects for access and deletion
  Fragmentation overheads caused by deletions, and the applicability of defragmentation processes (as well as the special considerations of any variable block-size implementation)
  Use and design of index structures and how they relate to the block sizes—these might preferably include one index of blocks for order-of-play across layers and another index for order-of-deletion by layer
  The resource demands on the player imposed by the handling of multiple layers
  The size of the archival storage unit—a small size limits the need for transient working storage and buffers for reordering, and a large size allows for most time-efficient deletion (as well as affecting alternative layer packing strategies and other efficiency factors in complex ways, as described below).

The specific trade-offs here are essentially engineering issues that depend on the situation and the details of that will be apparent to one skilled in the art.

Preferably, especially in cases where media objects are large relative to storage blocks, indexing schemes can be employed to give the effect of having data stored in both time and layer order. This can be done, for example, by maintaining one time-ordered index of blocks to use during playback (presentation) to list blocks by order-of-play, for efficient time-based access across layers, and another archival index to use for progressive deletion that specifies order-of-deletion, by layer, for the entire object. The simplicity of handling both kinds of activity in such a scheme may argue for designing media storage systems to have storage units of a size well suited to such a two-dimensional structuring.

Most of the examples described here fully separate the layers in physical storage units such that (logical) layer boundaries map to (physical) storage unit boundaries without overlap. Such structures are simple and are well suited to objects that are large relative to the size of the physical storage units that are released in deletions, but can allow for less than optimal use of space at any given time by leaving one storage unit per layer partially empty (which can become an issue when storage units are large relative to total storage). An alternative method is to store the partitioned layers in the same logical layer sequence, but stored with one layer immediately following another without aligning layers to storage unit boundaries, so that one unit may include part of two (or more) different layers. This can avoid wasted storage space, especially when layers are small relative to storage units (or storage units are large). In such case progressive deletions would free a storage unit only when all layers of data in that storage unit are deleted, and the directory data on layers would include some mapping data indicating which blocks have which layers, and would preferably specify the offsets of where layer boundaries occur within blocks that contain multiple layers. In this case, when a progressive deletion was done, there would be additional steps to determine which blocks were entirely releasable, and which must be retained as containing layer data that was not releasable, and to update the directories accordingly.

Allowing for such variations, where a given storage unit may contain only one layer, or, with overlapping storage boundaries, may contain two adjacent layers, or where multiple small layers may be packed into one storage unit, the deletion method may preferably be generalized to the following form. The method keeps track of what (or at least how many) logical layers are in each physical storage unit, and as progressive deletions are done, keeps track of which (or at least how many) layers are to be retained. When the number of retained layers in a storage unit goes to zero, the storage unit is released. Thus when layers are aligned with storage units, a single layer deletion releases the containing storage unit, but when they are not aligned, the release occurs only when all layers in the storage unit are surplussed. In an implementation where different objects may share a storage unit, the method would apply across all objects within a given storage unit.

In the case of non-continuous media, such as still images, for example, or any other form of content that may be scalable, the need to reorder layer data from time order to layer order as described above does not apply, but the issues of managing the relationship of logical storage of layers to physical storage remain, and similar methods to those just described apply to this case as well. In particular, the trade-off between fully segregated layers and layer stored so that their boundaries overlap storage units remains, and the design of data and directory structures suited to efficient progressive deletion for expected layer and storage unit sizes applies similar principles and methods. These methods enable progressive deletion to be done in a way that is efficient in both processing and storage resources, with trade-offs that can be tuned to the nature of the media objects and the storage facilities in the manner just described.

Considering all of these factors, the above-mentioned method of selecting layer data sizes that match to storage unit sizes can be exploited to make a highly efficient system. This becomes particularly attractive when transmission considerations do not cause conflicts, and layer sizes can be selected based primarily with regard to user system requirements, such as when content is received in an FGS format, converted from a non-layered source, or directly obtained at the user system, such a with a camera (video or still). In this variation of the method, the parameters that govern the process of layering are set to cause the layers to be of a size that is an exact multiple of the storage unit size (at least for objects beyond some minimum size). Correspondingly, the storage unit size is preferably engineered to be well-suited to the typical layer size. This method constrains quality choices to some degree, but enables significant economies in storage use and manipulation (and that is the essential goal of compression). With this method, layers map neatly to storage units without wasted space, layer directories simply follow this clean mapping, and progressive deletions involve simple release of some whole number of storage units. This strategy is readily accomplished using coding methods that achieve fine-granular scalability (allowing layer boundaries to be drawn as desired, but can also be done with other coding methods, as will be understood by those skilled in the art. This method is particularly attractive for use with still or video cameras, with their tightly constrained memory size, energy use, and performance requirements, and given the high cost of storage access and manipulation that puts a premium on efficiency. Camera designers can manipulate all of the relevant parameters to design or select storage with appropriate unit sizes, and to do the layering to match those sizes. With such a method in a still camera, for example, a "fit one more picture" operation can always be enabled by 1) always knowing how much space is desired for the next picture and what storage units can be taken to fit it (by doing the preparatory processing any time camera picture settings are altered), and 2) simply taking the new picture, coding it, storing it in the designated storage units, and revising the directory accordingly, thus imposing little time or energy cost or input/output activity beyond that of shooting with an empty storage. Also, as described earlier, until that next picture is actually taken, the slated deletions remain recoverable with no data loss.

It will be further understood that the included examples of the method are described in terms of relatively simple file systems, and that similar methods may be used to exploit advanced file system features to store and progressively delete layer data in an efficient manner. For example file systems that support streams as objects within files could store the layers as separate streams within a file to facilitate their deletion without interference with the remaining streams. Thus, with such techniques, progressive deletion benefits may be obtained even if any or all of the multiple layers are more efficiently stored and manipulated within a single file. File systems that support sparse streams, such as MICROSOFT NTFS, may also be exploitable to use those features to efficiently delete layers in similar ways. Also exploitable by similar methods is support of fractional blocks or "fragments".

It will also be understood that a variety means can be used to exploit RAID (Redundant Arrays of Independent Disks) and striping in conjunction with the methods described here. For example for high performance with large objects, each layer may be striped separately, but for small files or where performance is less critical, multiple layers may share a stripe group. This method of separating layers into distinct stripe groups can also give the effect of increasing storage bandwidth, and even in file systems without specific striping support, these methods can give the effect of striping by storing each layer as a separate file, with the layers being read in parallel.

Some other processing considerations and variations in the method include:

Possible use of auxiliary resources, such as a separate network-connected PC to assist in the required processing Structuring the reorder processing (and data structures) such that it is interruptible without loss of integrity, so that a file that is partly reordered and partly not reordered can be played without apparent discontinuity, and without undue redundancy in storage usage.

Re-ordering might be done on a just-in-time basis, when space is running out, to peel off one or more layers and save the rest.

If the input is not in scalable form, but is coded in a format that is adaptable to scaling, such as various MPEG versions, the decode/re-encode process may be subject to processing simplification, since the basic transforms, quantization and motion estimation encodings may be reused without duplicating the original processing.

An additional consideration is that lossy compression algorithms are often characterized by a quality metric parameter that correlates with perceived quality. This target quality parameter can preferably be applied in the re-ordering or partitioning of enhancement layer data described here. Essentially one can chose a partitioning that segments into equal amounts of storage, or one that segments into equal losses of quality. One can also use a composite method that considers both factors, such as, for example, one that creates a given layer only if it will save an amount of storage that exceeds some threshold level of efficiency relative to the quality loss. Coding of the presence or absence of such layers, and of the associated efficiency metric for each layer, could be included in the file format, and could also be separately tracked by the storage management system, to aid in the decisions of a reclamation algorithm (which items, when, for how much space).

Of course it is desirable that content be provided in a coding format that provides scaleable layers, since the methods described above exploit that built-in scalability. Nevertheless, this method can also be applied to content that is not obtained in layered form. In this case additional steps are needed to first transcode the data into a desirable layered coding format. This adds processing overheads, but does so only once, at the time the file is first written. These steps are preferably done as the data is received, possibly while it is being processed for real-time presentation, and before it is stored, and that enables efficiencies in use of processing, work areas, buffers, and input/output activity that can be achieved using methods well known to those skilled in the art. Once converted, the object is saved in a layer-ordered format suited to progressive deletion, and any number of progressive deletion steps can be performed thereafter without need for any further transcoding steps. Such methods can be applied to analog sources as well. This approach of layering-on-receipt may be very widely useful in the near term, such as in DVRs for use with conventional analog or digital broadcast, while use of scalable coding in source content is not yet widespread. Some current DVRs store analog TV as MPEG-2 by encoding it locally using coding schemes controlled within the DVR, and the methods described here can preferably take the form of software extensions to those existing coding and storage facilities. Similarly, such a local transcoding process could also be efficiently performed during any presentation process.

Preferably data would be stored in a scalable re-ordered format at the time of recording. Once the data is received (and any decoder constraints are addressed) there is no need to maintain a non-partitioned, real-time broadcast order, and an object can be stored in the archival order suited to progressive deletion. Alternatively, due to timing and resource issues, it can be desirable to do archival reordering in a separate pass, some time after an initial capture recording. An archiving system could manage this as a separate process, or in conjunction with replay, in which the original non-reordered version is read, reordered, and re-stored. This could be done as a background task, based on resource availability and schedule parameters, such as overnight.

Full exploitation of these methods would benefit from provision to the user of a comprehensive software-based archive manager service that would support any of a variety of media content types and of reception and presentation systems. Such a service would preferably allow progressive deletion to be done both manually and under automatic control, and would preferably include a suite of management tools and user agents. The service would preferably organize items into classes, set management policy rules (grouping them into rule families), track usage patterns, and manage how the rules are applied to both the classes of items and to selected individual items. Such tools would preferably combine artificial intelligence and learning with user controlled rules and explicit commands. These methods would preferably adapt dynamically to changing levels of storage supply and demand. This facility would preferably manage an entire hierarchy of personal storage, to manage caching for user subsystems and shared storage system servers, and migrate items from high-speed direct-access storage to archival media (such as a DVD-R jukebox), as well as manage backup and retention policies across all of a user's media assets. The methods of this facility would also preferably integrate or inter-work with other media content archiving and management methods such as those used in existing DVRs and those described in U.S. Pat. Nos. 6,236,395, and 6,324,338.

Storage management algorithms that apply progressive deletion under rich controls such as in such an archiving system might preferably be parameterized to specify rates of progressive deletion over time, and breakpoints at which the rate changes or holds. Thus some items might degrade at one rate for a period, then another for a longer period. Other items might degrade only to a set level and then be held at that level. Truly archival quality items would be set to not degrade at all.

There are parallels in the application of such policies to the use of hierarchical storage, virtual storage, and cache management algorithms for determining which items to delete (completely) from an upper level of hierarchy, such as least-recently used, lowest rated, least often linked to, least used, etc. Similar deletion priority rules might determine the decay rates to be applied to different items or classes of items. Key differences are that cache (hierarchical) management assumes that the cache (higher level) is supplementary to a backing store (lower level) that retains all items, so that deleted items can be restored (at some performance cost), and that deletion from a cache is of an entire object (or of storage unit without regard to its content associations), and not progressive with regard to the content of the data stored. Preferably, in an embodiment of progressive deletion applied in conjunction with a possible hierarchical storage system applied to media as proposed here, progressive deletion might be combined with such cache management methods to offer additional flexibility in storage space management.

In broad terms, this approach can be though of as an extension of the core idea of lossy compression, which is to discard the elements of least value to human perception. The new dimension here is time, as viewed across the lifetime of a collection of stored items. The importance of an item tends to decrease over time, and this approach exploits that principle, by applying loss selectively as items age (to those items which are oldest, and most devalued by age). Progressive deletion might preferably be done not only on explicit command to specific objects, but by automated archive management processes that apply rules for pruning back entire collections of objects. Standard profiles might be used for classes of content (with the option of specific override), to specify both the rate(s) of decay and the endpoints/breakpoints, such as these purely illustrative examples:

Time-sensitive TV broadcasts, such as news: very rapid decay over days, down to low quality Routine TV broadcast series: rapid decay over weeks, down to moderate quality, and slower thereafter Favorite TV broadcast series: no decay for 1-2 weeks, followed by moderate decay over weeks-months Movies, grouped in 3-5 levels: moderate decay over months (longer as large archives become practical), holding at a moderate quality level Home movies, grouped in levels: varying moderate decay over months-years, holding at a range of qualities Personal photo collections, grouped in levels: varying moderate decay over months-years, holding at a range of qualities Tools might be provided to facilitate periodic review and triage of items, on a scheduled basis, and as storage becomes constrained. These tools might include display of metadata descriptors and preview aids, such as thumbnails or video clips. An initial triage cycle (before and/or after recording) would be most important to set item-specific parameters and category selections.

Preferably the system would be structured to allow for creation of user profiles that define key parameters relating to the above and able to do that based on explicit entry or learning about user behavior, and would allow for balancing of the needs and preferences of multiple users sharing an archive and its storage resources, such as a family or office group. Some users may have higher priority, both as to retention policies for items they prefer, and as to level of authority to set policies and to allocate and manage space (such as to limit children's use). To the extent that user profile data is available in a standard format, the system would preferably accommodate that format.

Preferably an archive management system would integrate broader facilities, such as controls over initial levels of compression, and broad functions for the management of storage hierarchies, including disk, tape, DVD, and other storage media, as well as facilities for backup, security, privacy, access control and sharing, update integrity control, editing and version control, etc.

- Controls may be structured to associate policies for each of the control mechanisms with the types of objects and with the categories of objects (including individually identified objects).
- Preferably such policies for each control method would be congruently specified and based on consistent groupings of items by type and category, such that a single association of an object into a category would be sufficient to ensure coherent management policies for all control mechanisms applied to it (such as initial compression level, use of progressive deletion, migration to lower-level storage, etc.).
- Such control policies may be defined by the provider of the object, by the provider of the storage management system (or its components), or by the user, or obtained from others.
- Preferably a system of policies and rules would combine default schemes established by system providers (or others) that may work in conjunction with content provider suggestions, but subject to systematic modification by the user. This would enable the user to accept the offered defaults, to customize the rules on a generic basis to apply to defined types and categories, and to modify policies for specific objects or groups of objects.
- The system would preferably also enable compound object groups consisting of associated objects to be managed together using coherent policies, reflecting linked valuations, but applying media-type-specific actions. This would include rich multimedia such as enhanced TV with associated Web content or secondary video streams, or collections such as a series of music pieces grouped into a program (as a Disk Jockey compilation).
- Preferably these rules and policies would be specified in a standard format, such as Rule ML (Rules Markup Language), Simple Rule Markup Language (SRML), Business Rules Markup Language (BRML), Structured Rule Language (SRL), ILOG rules, or other agent-oriented languages, and preferably one based on XML, and preferably would be interoperable (or at least translatable) to work with a wide range of storage systems (and all consumer media object types).
- Also, preferably, these rules and policies would be structured to separate system-specific information and policies, such as storage size and characteristics, so that system storage facilities could be changed or expanded and the storage management policies to be used would adapt automatically with little or no need to rework or re-tune them.

The approach proposed here differs from HSMs as used in large enterprise-class data centers which address analogous problems of efficiently storing data for varied data processing applications with varying usage and retention requirements. The methods applied in an enterprise system must be adapted as discussed herein to the different media object types and categories, storage devices, and control requirements of a consumer home media system, and to the very simple yet powerful user interface required by an individual consumer or family. A key challenge of this adaptation is that such consumers or family members will act in the dual roles of both users and administrators of such a system, and will need to be able to set and manage rules and policies for their stored objects for themselves. It should be noted that some aspects of conventional enterprise storage management and HSM may be applicable to managing the central source archives that support server-side distribution of multimedia content, such as for remote video on demand services, but that is still an enterprise environment, and unlike a home (personal/family) environment, as addressed by the proposed system.

A key method for addressing differences from enterprise systems is a composite policy definition process which applies pre-specified policy defaults that are defined by the system or content providers or third party support services, and subject to modification by the user. Such modification can be made easy by specifying the default policies and categories to the user in simple terms, and allowing the user to simply accept them, for a user to select among some simple variations, or for an advanced user to dig deeper into the details of the rules and override specific parameters and relationships. Such systems would initially need to be very simple, but over time, a significant population of users could gain sophistication and seek more advanced controls.

Adoption of a HSM system for consumer media centers on appropriate policies for:

- when to migrate object sets to lower-level media which may be larger and cheaper, but slower and not always mounted
- when and how to access objects not immediately accessible (including automatic and manual loading)
- whether to reverse migrate objects to faster devices for more effective use.

Here again, policies would be set based on the type and category of the object, subject to user override.

Expanding further on the kinds of categories that might be useful in a personal/family media archiving system, a category structure might be defined in terms of multiple dimensions

- families of object content categories, such as movies, TV series, TV news, music, etc
- source object quality categories, such as HDTV, DTV, VCR, VGA (Video Graphics Adapter), ¼-VGA, SVGA (Super VGA), CD-audio, MP3 (lossy) audio, etc.
- longevity categories, such as permanent, long, short
- replaceability categories, such as impossible, difficult, easy
- personal importance categories, such as maximum, high, medium, low The rule set might then define policies for each combination of categories, and this would facilitate desirable behaviors, such as high importance HDTV being managed differently from high importance ¼-VGA. The user could then change the rules for handling objects within a category combination, or change the rules defining what objects fall into what categories. Such changes could be continuing or for a specific time, and for all objects or just specified objects (or categories).

Preferably a flexible facility might be provided to perform any necessary coding/re-ordering functions, and such a facility could be interfaced to other subsystems, such as its recording facility and its archive management facility, via a well-defined and flexible Applications Programming Interface (API). Such a facility could be a distinct software product, usable by any media system, including DVRs, gateway servers, and Storage Area Networks, or by other devices, and could be applied on each such device, or by using a shared server facility.

The essence of such a facility would be to:
input a stream, either as received from a remote source or from a file system;
interpret it (decoding and recoding if needed);
optionally output a version of the stream for presentation;
re-order it;
store it; and
plus, either separately or during the above, to delete one or more layers.

A wide variety of variations in operation can be viewed in terms of combinations of basic options and parameters that might preferably be specified using the API.

Input: layered or not. Preferably any input stream format could be used, with processing varied accordingly.
Archival output: layered or not, and what format options. Preferably for progressive deletion, the output would be layered, but in cases where real-time processing resources were limiting, this could be deferred to a later non-real-time cycle.
Presentation: active or not. Depending on the usage mode, the user may wish to view the content as it is being recorded (or re-ordered) or not.
Layering: single EL or specified number or size or quality level of EL layers to be re-ordered to and stored. This may usefully vary depending on the specific data types, coding algorithms, archive management methods, and user objectives.
Stripping/deletion: what number of layers is to be deleted. This will depend on the amount of storage to be released. Alternatively, deletion may be specified in terms of equivalent or related metrics, including amount of space, fraction of space, amount of quality, fraction of quality, and the like.
  In cases where viewing is not done, if the stored file is already formatted for progressive deletion, stripping may be done by simple deletion.
  In cases where the file is not yet formatted for progressive deletion, a re-ordering pass would typically be required.
  In cases where the content is being viewed, situational rules may govern whether it is to be deleted entirely, by n levels, or not at all.
  In cases of background re-ordering, zero stripping might be selected.

This can yield a highly flexible facility that can be used to perform varying combinations of processing to manage an archive under widely varying conditions and rule sets.

This new approach to management and compression for archival storage of media objects provides compressed storage formats that can decay or degrade gradually over time by releasing space, at some cost in quality, while still retaining the ability to view or present the object. Thus instead of dropping one movie to record another, for example, a storage system might reduce the quality of five movies to make room for one new one. Similarly, if one fell behind in viewing installments of a serial, it might often be preferable to lose some fidelity than to lose entire episodes. These methods further enable such reductions to be done a highly efficient manner.

Although the invention has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A processor-implemented method for managing storage capacity, comprising:
storing an object in machine-readable format having at least an entire first layer of high significance data and an entire second layer of separately-deletable low-significance data;
determining via a processor a condition for deleting the entire second layer while retaining the entire first layer;
determining the extent of the entire second layer in the storage system that the entire second layer is stored in, and
deleting the entire second layer automatically upon satisfaction of the condition, whereby the object is still accessible by a user through the entire first layer.

2. The method of claim 1, wherein the object is a continuous media object.

3. The method of claim 1, wherein the object is initially stored in the format.

4. The method of claim 1, wherein the object is initially stored in a second format without separately-deletable layers of data.

5. The method of claim 1, wherein the object is initially stored in a second format containing layer data that is ordered predominantly by time sequence and converted to a format that is ordered predominantly by layer sequence.

6. The method of claim 1, wherein the object is at least one of: a video file having at least two frames, an audio file, a multimedia file that includes continuous media elements, an object based multimedia file that includes continuous media elements and a streaming multimedia file.

7. The method of claim 1, wherein the object is a still image file.

8. The method of claim 1, wherein the format comprises a plurality of high-significance and low-significance layers.

9. The method of claim 8, wherein the plurality of high-significance and low-significance layers comprise a plurality of layers of data of progressively decreasing significance, whereby at least two said layers are separately marked for deletion from a lower significance to higher significance based on the condition.

10. The method of claim 9, wherein a lowest significance layer is deleted before a higher significance layer.

11. The method of claim 1, wherein the condition is based on a specified period of time passing from said storing.

12. The method of claim 1, wherein said condition is based on a threshold level of available storage space.

13. The method of claim 1, wherein said condition is based on a user action indicative of the user's authorization to permit the layer to be deleted.

14. The method of claim 1, further comprising:
determining a second condition for deleting the higher significance layer; and deleting the higher significance layer automatically upon satisfaction of the second condition, whereby the object is accessible to the user in remaining successively higher significance layers of data.

15. The method of claim 1, wherein the layers correspond to quality levels of data such that deletion of the lower layer of data results in a minimal impact on a perception quality of the object.

16. The method of claim 1, wherein said first and second layers are stored as separately addressable file structure elements associated with the object.

17. The method of claim 1, wherein said first and second layers are stored as separately deletable file structure elements associated with the object.

18. The method of claim 1, wherein said first and second layers are separately stored in at least two physical storage units associated with the object.

19. The method of claim 1, wherein the object is stored on at least one of: a computer memory device, a digital video recorder memory, a music storage system, a video storage system, a television reception device, a television set-top box, a game system, an entertainment media storage system and a home entertainment system.

20. The method of claim 1, wherein the object is stored within at least one of: a still image camera and a video camera.

21. The method of claim 1, wherein said storing further comprises:
receiving a plurality of layers of data for the object.

22. The method of claim 1, wherein said storing further comprises:
receiving a plurality of layers of data for the object; and
storing less than all the layers for the object.

23. The method of claim 1, wherein said deleting further comprises:
deleting the second layer from a first storage device; and
designating the second layer for storage in a second storage device.

24. The method of claim 1, wherein said deleting further comprises:
confirming that the second layer is stored in a second storage device; and
deleting the second layer from a first storage device.

25. The method of claim 1, further comprising:
receiving the object from at least one of: a communications transmission, a storage device, a capture/creation device, and a second storage device on a computer network.

26. The method of claim 1, wherein said deleting substantially preserves the perception of the object without apparent truncation.

27. The method of claim 1, wherein said deleting is accomplished without re-storing the first layer.

28. The method of claim 1, wherein said deleting is accomplished by changing directory entries in a file management system.

29. The method of claim 1, wherein said layers may correspond to at least one of: spatial data, temporal data, and quality data.

30. An apparatus for managing storage capacity, comprising:
means for storing an object in machine-readable format having at least a first layer of high-significance data and a second layer of separately-deletable low-significance data;
means for determining a condition for deleting the second layer while retaining the first layer;
means for determining the extent of the entire second layer in the storage medium that the entire second layer is stored in, and
means for deleting the second layer automatically upon satisfaction of the condition, whereby the object is still accessible by a user.

31. The apparatus of claim 30, wherein the object is a continuous media object.

32. The apparatus of claim 30, wherein the object is initially stored in the format.

33. The apparatus of claim 30, wherein the object is initially stored in a second format without separately-deletable layers of data.

34. The apparatus of claim 30, wherein the object is initially stored in a second format containing layer data that is ordered predominantly by time sequence and converted to a format that is ordered predominantly by layer sequence.

35. The apparatus of claim 30, wherein the object is at least one of: a video file having at least two frames, an audio file, a multimedia file that includes continuous media elements, an object based multimedia file that includes continuous media elements and a streaming multimedia file.

36. The apparatus of claim 30, wherein the object is a still image file.

37. The apparatus of claim 30, wherein the format comprises a plurality of high-significance and low-significance layers.

38. The apparatus of claim 37, wherein the plurality of high-significance and low-significance layers comprise a plurality of layers of data of progressively decreasing significance, whereby at least two said layers are separately marked for deletion from a lower significance to higher significance based on the condition.

39. The apparatus of claim 38, wherein a lowest significance layer is deleted before a higher significance layer.

40. The apparatus of claim 30, wherein the condition is based on a specified period of time passing from said storing.

41. The apparatus of claim 30, wherein said condition is based on a threshold level of available storage space.

42. The apparatus of claim 30, wherein said condition is based on a user action indicative of the user's authorization to permit the layer to be deleted.

43. The apparatus of claim 30, further comprising:
means for determining a second condition for deleting the higher significance layer; and
means for deleting the higher significance layer automatically upon satisfaction of the second condition, whereby the object is accessible to the user in remaining successively higher significance layers of data.

44. The apparatus of claim 30, wherein the layers correspond to quality levels of data such that deletion of the lower layer of data results in a minimal impact on a perception quality of the object.

45. The apparatus of claim 30, wherein said first and second layers are stored as separately addressable file structure elements associated with the object.

46. The apparatus of claim 30, wherein said first and second layers are stored as separately deletable file structure elements associated with the object.

47. The apparatus of claim 30, wherein said first and second layers are separately stored in at least two physical storage units associated with the object.

48. The apparatus of claim 30, wherein the object is stored on at least one of: a computer memory device, a digital video recorder memory, a music storage system, a video storage system, a television reception device, a television set-top box, a game system, an entertainment media storage system and a home entertainment system.

49. The apparatus of claim 30, wherein the object is stored within at least one of: a still image camera and a video camera.

50. The apparatus of claim 30, wherein said means for storing further comprise:
   means for receiving a plurality of layers of data for the object.

51. The apparatus of claim 30, wherein said means for storing further comprise:
   means for receiving a plurality of layers of data for the object; and
   means for storing less than all the layers for the object.

52. The apparatus of claim 30, wherein said means for deleting further comprise:
   means for deleting the second layer from a first storage device; and
   means for designating the second layer for storage in a second storage device.

53. The apparatus of claim 30, wherein said means for deleting further comprise:
   means for confirming that the second layer is stored in a second storage device; and
   means for deleting the second layer from a first storage device.

54. The apparatus of claim 30, further comprising:
   means for receiving the object from at least one of: a communications transmission, a storage device, a capture/creation device, and a second storage device on a computer network.

55. The apparatus of claim 30, wherein said means for deleting substantially preserve the perception of the object without apparent truncation.

56. The apparatus of claim 30, wherein said means for deleting delete without re-storing the first layer.

57. The apparatus of claim 30, wherein said means for deleting delete by changing directory entries in a file management system.

58. The apparatus of claim 30, wherein said layers may correspond to at least one of: spatial data, temporal data, and quality data.

59. An apparatus for managing storage capacity, comprising:
   a processor; and
   a memory in operative communication with the processor, the memory for storing a plurality of processing instructions directing the processor to:
      store an object in machine-readable format having at least an entire first layer of high significance data and an entire second layer of separately-deletable low-significance data;
      recognize a condition for deleting the entire second layer while retaining the entire first layer;
      determine the extent of the entire second layer in the storage system that the entire second layer is stored in, and
      delete the entire second layer automatically upon satisfaction of the condition, whereby the object is still accessible by a user.

60. The apparatus of claim 59, wherein the object is a continuous media object.

61. The apparatus of claim 59, wherein the object is initially stored in the format.

62. The apparatus of claim 59, wherein the object is initially stored in a second format without separately-deletable layers of data.

63. The apparatus of claim 59, wherein the object is initially stored in a second format containing layer data that is ordered predominantly by time sequence and converted to a format that is ordered predominantly by layer sequence.

64. The apparatus of claim 59, wherein the object is at least one of: a video file having at least two frames, an audio file, a multimedia file that includes continuous media elements, an object based multimedia file that includes continuous media elements and a streaming multimedia file.

65. The apparatus of claim 59, wherein the object is a still image file.

66. The apparatus of claim 59, wherein the format comprises a plurality of high-significance and low-significance layers.

67. The apparatus of claim 66, wherein the plurality of high-significance and low-significance layers comprise a plurality of layers of data of progressively decreasing significance, whereby at least two said layers are separately marked for deletion from a lower significance to higher significance based on the condition.

68. The apparatus of claim 67, wherein a lowest significance layer is deleted before a higher significance layer.

69. The apparatus of claim 59, wherein the condition is based on a specified period of time passing from said storing.

70. The apparatus of claim 59, wherein said condition is based on a threshold level of available storage space.

71. The apparatus of claim 59, wherein said condition is based on a user action indicative of the user's authorization to permit the layer to be deleted.

72. The apparatus of claim 59, further comprising:
   instructions operating to determine a second condition for deleting the higher significance layer; and
   instructions operating to delete the higher significance layer automatically upon satisfaction of the second condition, whereby the object is accessible to the user in remaining successively higher significance layers of data.

73. The apparatus of claim 59, wherein the layers correspond to quality levels of data such that deletion of the lower layer of data results in a minimal impact on a perception quality of the object.

74. The apparatus of claim 59, wherein said first and second layers are stored as separately addressable file structure elements associated with the object.

75. The apparatus of claim 59, wherein said first and second layers are stored as separately deletable file structure elements associated with the object.

76. The apparatus of claim 59, wherein said first and second layers are separately stored in at least two physical storage units associated with the object.

77. The apparatus of claim 59, wherein the object is stored on at least one of: a computer memory device, a digital video recorder memory, a music storage system, a video storage system, a television reception device, a television set-top box, a game system, an entertainment media storage system and a home entertainment system.

78. The apparatus of claim 59, wherein the object is stored within at least one of: a still image camera and a video camera.

79. The apparatus of claim 59, wherein said instructions operating to store further comprise:
   instructions operating to receive a plurality of layers of data for the object.

80. The apparatus of claim 59, wherein said instructions operating to store further comprise:
   instructions operating to receive a plurality of layers of data for the object; and instructions operating to store less than all the layers for the object.

81. The apparatus of claim 59, wherein said instructions operating to delete further comprise:
   instructions operating to delete the second layer from a first storage device; and
   instructions operating to designate the second layer for storage in a second storage device.

82. The apparatus of claim 59, wherein said instructions operating to delete further comprise:
   instructions operating to confirm that the second layer is stored in a second storage device; and
   instructions operating to delete the second layer from a first storage device.

83. The apparatus of claim 59, further comprising:
   instructions operating to receive the object from at least one of: a communications transmission, a storage device, a capture/creation device, and a second storage device on a computer network.

84. The apparatus of claim 59, wherein said instructions operating to delete substantially preserve the perception of the object without apparent truncation.

85. The apparatus of claim 59, wherein said instructions operate to delete without re-storing the first layer.

86. The apparatus of claim 59, wherein said instructions operate to delete by changing directory entries in a file management system.

87. The apparatus of claim 59, wherein said layers may correspond to at least one of:
   spatial data, temporal data, and quality data.

88. A processor-implemented method for managing data storage capacity, comprising:
   storing a plurality of objects in machine readable format having at least an entire first layer of high-significance data and an entire second layer of separately-deletable low-significance data;
   determining via a processor a condition for deleting the entire second layer from each of the plurality of objects while retaining the entire first layer; and
   deleting the entire second layer automatically upon satisfaction of the condition, whereby the objects are still accessible by a user.

89. The method of claim 88, wherein the object is a continuous media object.

90. The method of claim 88, wherein the object is initially stored in the format.

91. The method of claim 88, wherein the object is initially stored in a second format without separately-deletable layers of data.

92. The method of claim 88, wherein the object is initially stored in a second format containing layer data that is ordered predominantly by time sequence and converted to a format that is ordered predominantly by layer sequence.

93. The method of claim 88, wherein the object is at least one of: a video file having at least two frames, an audio file, a multimedia file that includes continuous media elements, an object based multimedia file that includes continuous media elements and a streaming multimedia file.

94. The method of claim 88, wherein the object is a still image file.

95. The method of claim 88, wherein the format comprises a plurality of high-significance and low-significance layers.

96. The method of claim 95, wherein the plurality of high-significance and low-significance layers comprise a plurality of layers of data of progressively decreasing significance, whereby at least two said layers are separately marked for deletion from a lower significance to higher significance based on the condition.

97. The method of claim 96, wherein a lowest significance layer is deleted before a higher significance layer.

98. The method of claim 88, wherein the condition is based on a specified period of time passing from said storing.

99. The method of claim 88, wherein said condition is based on a threshold level of available storage space.

100. The method of claim 88, wherein said condition is based on a user action indicative of the user's authorization to permit the layer to be deleted.

101. The method of claim 88, further comprising:
   determining a second condition for deleting the higher significance layer; and
   deleting the higher significance layer automatically upon satisfaction of the second condition, whereby the object is accessible to the user in remaining successively higher significance layers of data.

102. The method of claim 88, wherein the layers correspond to quality levels of data such that deletion of the lower layer of data results in a minimal impact on a perception quality of the object.

103. The method of claim 88, wherein said first and second layers are stored as separately addressable file structure elements associated with the object.

104. The method of claim 88, wherein said first and second layers are stored as separately deletable file structure elements associated with the object.

105. The method of claim 88, wherein said first and second layers are separately stored in at least two physical storage units associated with the object.

106. The method of claim 88, wherein the object is stored on at least one of: a computer memory device, a digital video recorder memory, a music storage system, a video storage system, a television reception device, a television set-top box, a game system, an entertainment media storage system and a home entertainment system.

107. The method of claim 88, wherein the object is stored within at least one of:
   a still image camera and a video camera.

108. The method of claim 88, wherein said storing further comprises: receiving a plurality of layers of data for the object.

109. The method of claim 88, wherein said storing further comprises:
   receiving a plurality of layers of data for the object; and
   storing less than all the layers for the object.

110. The method of claim 88, wherein said deleting further comprises:
   deleting the second layer from a first storage device; and
   designating the second layer for storage in a second storage device.

111. The method of claim 88, wherein said deleting further comprises:
   confirming that the second layer is stored in a second storage device; and
   deleting the second layer from a first storage device.

112. The method of claim 88, further comprising:
   receiving the object from at least one of: a communications transmission, a storage device, a capture/creation device, and a second storage device on a computer network.

113. The method of claim 88, wherein said deleting substantially preserves the perception of the object without apparent truncation.

114. The method of claim 88, wherein said deleting is accomplished without re-storing the first layer.

115. The method of claim 88, wherein said deleting is accomplished by changing directory entries in a file management system.

116. The method of claim 88, wherein said layers may correspond to at least one of: spatial data, temporal data, and quality data.

117. A computer-readable medium encoded with processing instructions for implementing a method, performed by a computing device, for managing storage capacity, comprising instructions for:
  storing an object in machine-readable format having at least an entire first layer of high significance data and an entire second layer of separately-deletable low-significance data;
  determining a condition for deleting the entire second layer while retaining the entire first layer; and
  deleting the entire second layer automatically upon satisfaction of the condition, whereby the object is still accessible by a user.

118. The computer-readable medium of claim 117, wherein the object is a continuous media object.

119. The computer-readable medium of claim 117, wherein the object is initially stored in the format.

120. The computer-readable medium of claim 117, wherein the object is initially stored in a second format without separately-deletable layers of data.

121. The computer-readable medium of claim 117, wherein the object is initially stored in a second format containing layer data that is ordered predominantly by time sequence and converted to a format that is ordered predominantly by layer sequence.

122. The computer-readable medium of claim 117, wherein the object is at least one of: a video file having at least two frames, an audio file, a multimedia file that includes continuous media elements, an object based multimedia file that includes continuous media elements and a streaming multimedia file.

123. The computer-readable medium of claim 117, wherein the object is a still image file.

124. The computer-readable medium of claim 117, wherein the format comprises a plurality of high-significance and low-significance layers.

125. The computer-readable medium of claim 124, wherein the plurality of high-significance and low-significance layers comprise a plurality of layers of data of progressively decreasing significance, whereby at least two said layers are separately marked for deletion from a lower significance to higher significance based on the condition.

126. The computer-readable medium of claim 125, wherein a lowest significance layer is deleted before a higher significance layer.

127. The computer-readable medium of claim 117, wherein the condition is based on a specified period of time passing from said storing.

128. The computer-readable medium of claim 117, wherein said condition is based on a threshold level of available storage space.

129. The computer-readable medium of claim 117, wherein said condition is based on a user action indicative of the user's authorization to permit the layer to be deleted.

130. The computer-readable medium of claim 117, wherein the instructions further comprise:
  determining a second condition for deleting the higher significance layer; and
  deleting the higher significance layer automatically upon satisfaction of the second condition, whereby the object is accessible to the user in remaining successively higher significance layers of data.

131. The computer-readable medium of claim 117, wherein the layers correspond to quality levels of data such that deletion of the lower layer of data results in a minimal impact on a perception quality of the object.

132. The computer-readable medium of claim 117, wherein said first and second layers are stored as separately addressable file structure elements associated with the object.

133. The computer-readable medium of claim 117, wherein said first and second layers are stored as separately deletable file structure elements associated with the object.

134. The computer-readable medium of claim 117, wherein said first and second layers are separately stored in at least two physical storage units associated with the object.

135. The computer-readable medium of claim 117, wherein the object is stored on at least one of: a computer memory device, a digital video recorder memory, a music storage system, a video storage system, a television reception device, a television set-top box, a game system, an entertainment media storage system and a home entertainment system.

136. The computer-readable medium of claim 117, wherein the object is stored within at least one of: a still image camera and a video camera.

137. The computer-readable medium of claim 117, wherein said instructions for storing further comprise:
  receiving a plurality of layers of data for the object.

138. The computer-readable medium of claim 117, wherein said instructions for storing further comprise:
  receiving a plurality of layers of data for the object; and
  storing less than all the layers for the object.

139. The computer-readable medium of claim 117, wherein said instructions for deleting further comprise:
  deleting the second layer from a first storage device; and
  designating the second layer for storage in a second storage device.

140. The computer-readable medium of claim 117, wherein said instructions for deleting further comprise:
  confirming that the second layer is stored in a second storage device; and
  deleting the second layer from a first storage device.

141. The computer-readable medium of claim 117, wherein the instructions further comprise:
  receiving the object from at least one of: a communications transmission, a storage device, a capture/creation device, and a second storage device on a computer network.

142. The computer-readable medium of claim 117, wherein said instructions for deleting substantially preserve the perception of the object without apparent truncation.

143. The computer-readable medium of claim 117, wherein said instructions for deleting delete without re-storing the first layer.

144. The computer-readable medium of claim 117, wherein said instructions for deleting delete by changing directory entries in a file management system.

145. The computer-readable medium of claim 117, wherein said layers may correspond to at least one of: spatial data, temporal data, and quality data.

* * * * *